United States Patent
Yamamoto et al.

(10) Patent No.: US 9,884,303 B2
(45) Date of Patent: Feb. 6, 2018

(54) REFORMER

(75) Inventors: Jun Yamamoto, Wako (JP); Yukihiko Kiyohiro, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 1094 days.

(21) Appl. No.: 13/062,905

(22) PCT Filed: Aug. 12, 2009

(86) PCT No.: PCT/JP2009/064474
§ 371 (c)(1),
(2), (4) Date: Mar. 8, 2011

(87) PCT Pub. No.: WO2010/026874
PCT Pub. Date: Mar. 11, 2010

(65) Prior Publication Data
US 2011/0165483 A1 Jul. 7, 2011

(30) Foreign Application Priority Data
Sep. 8, 2008 (JP) .................. 2008-229688

(51) Int. Cl.
*H01M 8/06* (2016.01)
*B01J 19/00* (2006.01)
(Continued)

(52) U.S. Cl.
CPC ............ *B01J 8/0484* (2013.01); *B01J 8/009* (2013.01); *B01J 8/0085* (2013.01); *B01J 8/0496* (2013.01);
(Continued)

(58) Field of Classification Search
None
See application file for complete search history.

(56) References Cited

U.S. PATENT DOCUMENTS 2,472,254 A    6/1949    Johnson
3,262,758 A *   7/1966    Russell .................. C01B 3/48
                                                                        252/373

(Continued)

FOREIGN PATENT DOCUMENTS

JP           6-263401          9/1994
JP         2001-106507     4/2001
(Continued)

OTHER PUBLICATIONS

International Search Report for Application No. PCT/JP2009/064474, dated Feb. 23, 2010.
(Continued)

*Primary Examiner* — Barbara L Gilliam
*Assistant Examiner* — Adam A Arciero
(74) *Attorney, Agent, or Firm* — Nelson Mullins Riley & Scarborough LLP; Anthony A. Laurentano

(57) ABSTRACT

A reformer includes a reforming chamber having a raw fuel passage through which a raw fuel flows, the reforming chamber being filled with or carrying a reforming catalyst, a supply chamber disposed upstream of the reforming chamber, for uniformly supplying the raw fuel to the raw fuel passage, and a discharge chamber disposed downstream of the reforming chamber, for uniformly discharging the raw fuel from the raw fuel passage. The raw fuel passage has first and second reversers for reversing the direction in which the raw fuel flows. The raw fuel passage has a cross-sectional area which is smaller in a downstream portion thereof than in an upstream portion thereof.

17 Claims, 21 Drawing Sheets

(51) Int. Cl.
 *B01J 8/04* (2006.01)
 *B01J 8/00* (2006.01)
 *B01J 19/24* (2006.01)
 *C01B 3/38* (2006.01)
 *H01M 8/0612* (2016.01)
 *H01M 8/124* (2016.01)

(52) U.S. Cl.
 CPC ............. *B01J 19/249* (2013.01); *C01B 3/384* (2013.01); *H01M 8/0618* (2013.01); *B01J 2208/0053* (2013.01); *B01J 2208/00132* (2013.01); *B01J 2208/00203* (2013.01); *B01J 2208/00309* (2013.01); *B01J 2208/00504* (2013.01); *B01J 2219/1923* (2013.01); *B01J 2219/2453* (2013.01); *B01J 2219/2455* (2013.01); *B01J 2219/2458* (2013.01); *B01J 2219/2462* (2013.01); *B01J 2219/2481* (2013.01); *C01B 2203/0233* (2013.01); *C01B 2203/066* (2013.01); *C01B 2203/0805* (2013.01); *C01B 2203/1241* (2013.01); *C01B 2203/1247* (2013.01); *C01B 2203/1276* (2013.01); *C01B 2203/1288* (2013.01); *C01B 2203/1294* (2013.01); *H01M 2008/1293* (2013.01)

(56) References Cited

U.S. PATENT DOCUMENTS

| | | | |
|---|---|---|---|
| 3,449,099 | A | 6/1969 | Taylor et al. |
| 3,898,049 | A | 8/1975 | Burroughs et al. |
| 7,462,224 | B2 | 12/2008 | Wolff |
| 7,674,445 | B2 | 3/2010 | Taguchi et al. |
| 8,500,875 | B2 * | 8/2013 | Yamamoto ................. 96/108 |
| 2006/0213124 | A1 * | 9/2006 | Maruchi ..................... 48/61 |
| 2008/0254327 | A1 * | 10/2008 | Miyazaki .................... 429/19 |

FOREIGN PATENT DOCUMENTS

| | | |
|---|---|---|
| JP | 2005-255896 | 9/2005 |
| JP | 2006-273635 | 10/2006 |
| JP | 2008-117652 | 5/2008 |
| WO | WO 2006126702 A1 * | 11/2006 |

OTHER PUBLICATIONS

U.S. Appl. No. 13/062,893, dated Oct. 16, 2012, Christopher P. Jones.
Japanese Office Action for Application No. 2008-229688, 5 pages, dated Nov. 27, 2012.
Japanese Office Action for Application No. 2008-229678, 4 pages, dated Jan. 8, 2013.
U.S. Appl. No. 13/062,893, filed Mar. 8, 2011, Jun Yamamoto.

* cited by examiner

REFORMER

RELATED APPLICATIONS

This application is a 35 U.S.C. 371 national stage filing of International Application No. PCT/JP2009/064474, filed Aug. 12, 2009, which claims priority to Japanese Patent Application No. 2008-229688 filed on Sep. 8, 2008 in Japan. The contents of the aforementioned applications are hereby incorporated by reference.

TECHNICAL FIELD

The present invention relates to a reformer for reforming a raw fuel which primarily contains hydrocarbon.

BACKGROUND ART

Typically, a solid oxide fuel cell (SOFC) employs a solid electrolyte comprising ion-conductive solid oxide such as stabilized zirconia, for example. The electrolyte is interposed between an anode and a cathode to form an electrolyte electrode assembly. The electrolyte electrode assembly is interposed between separators (bipolar plates). In use, normally, predetermined numbers of the electrolyte electrode assemblies and the separators are stacked together to form a fuel cell stack.

As the fuel gas supplied to the fuel cell, normally, a hydrogen gas generated from hydrocarbon raw material by a reformer is used. In general, in the reformer, a reformed raw material gas is obtained from hydrocarbon raw material of a fossil fuel or the like, such as methane or LNG, and the reformed raw material gas undergoes steam reforming, partial oxidation reforming, or autothermal reforming to produce a reformed gas (fuel gas).

As shown in FIG. 20 of the accompanying drawings, a reformer disclosed in Japanese Laid-Open Patent Publication No. 2006-273635, for example, has a lower plate $1a$ and an upper plate $2a$. The lower plate $1a$ supports thereon a plurality of upwardly extending partition plates $3a$, and the upper plate $2a$ supports thereon a plurality of downwardly extending partitions $4a$, thereby defining a fluid passage $7a$ that is serpentine up and down and extends from a fuel inlet $5a$ to a fuel outlet $6a$.

Although not a reformer, Japanese Laid-Open Patent Publication No. 2008-117652 discloses a desulfurizer, which is similar in construction to the reformer, for use with a fuel cell. As shown in FIG. 21 of the accompanying drawings, the disclosed desulfurizer comprises a hollow cylindrical vessel $1b$ having a gas flow passage SP through which a fuel gas flows, partition plates $2b$ disposed as wall members and partition members in the gas flow passage SP, and a desulfurizing agent $3b$ which fills the gas flow passage SP.

Since the gas flow passage SP is segmented into a plurality of passageways by the partition plates $2b$, the fuel gas which flows in the gas flow passage SP is also divided into a plurality of fuel gas streams and hence, uneven flow distribution of the fuel gas is prevented in the gas flow passage SP.

However, the reformer disclosed in Japanese Laid-Open Patent Publication No. 2006-273635 finds it difficult to meet minimum flow velocity requirements and tends to fail to prevent uneven flow distribution of the fuel gas, in a wide operating range. In addition, the disclosed reformer cannot absorb pulsation flows of raw fuel and hence cannot supply a reformed raw fuel stably.

If the desulfurizer disclosed in Japanese Laid-Open Patent Publication No. 2008-117652 is used as a reformer, then it also fails to meet minimum flow velocity requirements and is unable to prevent uneven flow distribution of the fuel gas, in a wide operating range from a partial load operation mode to a rated operation mode. In addition, the disclosed desulfurizer used as the reformer cannot absorb pulsation flows of raw fuel and hence cannot supply a reformed raw fuel stably.

If the gas flow passage SP is increased in length for a better reforming capability, then the reformer itself is increased in size (length) and cannot be made compact.

SUMMARY OF INVENTION

It is an object of the present invention to provide a reformer which is simple in structure and small in size, is capable of maintaining a desired reforming efficiency and reforming capability in a wide operating range, is highly durable, and is capable of supplying a reformed raw fuel stably.

The present invention is concerned with a reformer for reforming a raw fuel which primarily contains hydrocarbon. The reformer includes a reforming chamber having a raw fuel passage through which the raw fuel flows, the reforming chamber being filled with or carrying a reforming catalyst, a supply chamber disposed upstream of the reforming chamber, for uniformly supplying the raw fuel to the raw fuel passage, and a discharge chamber disposed downstream of the reforming chamber, for uniformly discharging the raw fuel from the raw fuel passage. The raw fuel passage has at least one reverser for reversing the direction in which the raw fuel flows. The raw fuel passage has a cross-sectional area which is smaller in a downstream portion thereof than in an upstream portion thereof.

With the above arrangement of the present invention, since the raw fuel that is supplied to the reformer is temporarily stored in the supply chamber, the raw fuel is supplied uniformly to the entire area of the raw fuel passage. The reformed raw fuel (hereinafter referred to as "reformed gas") flows from the reforming chamber and is temporarily stored in the discharge chamber. Therefore, the reformed gas is discharged uniformly from the entire area of the raw fuel passage. Consequently, the entire area of the reforming catalyst can effectively be utilized, resulting in an improved reforming efficiency.

Further, the raw fuel passage has the reversers for reversing the direction in which the raw fuel flows. Therefore, the overall length of the reformer is reduced, whereas the raw fuel passage is effectively elongated. Since the raw fuel and the reforming catalyst are held in contact with each other over a long period of time, the reformer has a high reforming capability.

Furthermore, the cross-sectional area of the raw fuel passage is smaller in its downstream portion than in its upstream portion. Thus, in a partial load operation mode, the raw fuel flows through the region of the raw fuel passage which has a smaller cross-sectional area at a minimum flow velocity. In a rated operation mode, the raw fuel flows through the entire raw fuel passage at a minimum flow velocity. Accordingly, in a wide operating range, the raw fuel passage is effective to prevent uneven flow distribution of the raw fuel, and is also effective to utilize the reforming catalyst in its entirety over a long period of time. The reformer is therefore highly durable and can be serviced for maintenance at increased time intervals.

The reformer can have a function as a pressure regulation chamber (buffer tank). Therefore, the reformer can absorb raw fuel pulsation flows and can supply a reformed gas stably, thereby allowing a fuel cell combined therewith to operate stably.

The above and other objects, features, and advantages of the present invention will become more apparent from the following description when taken in conjunction with the accompanying drawings in which preferred embodiments of the present invention are shown by way of illustrative example.

DESCRIPTION OF EMBODIMENTS

Figure 1:
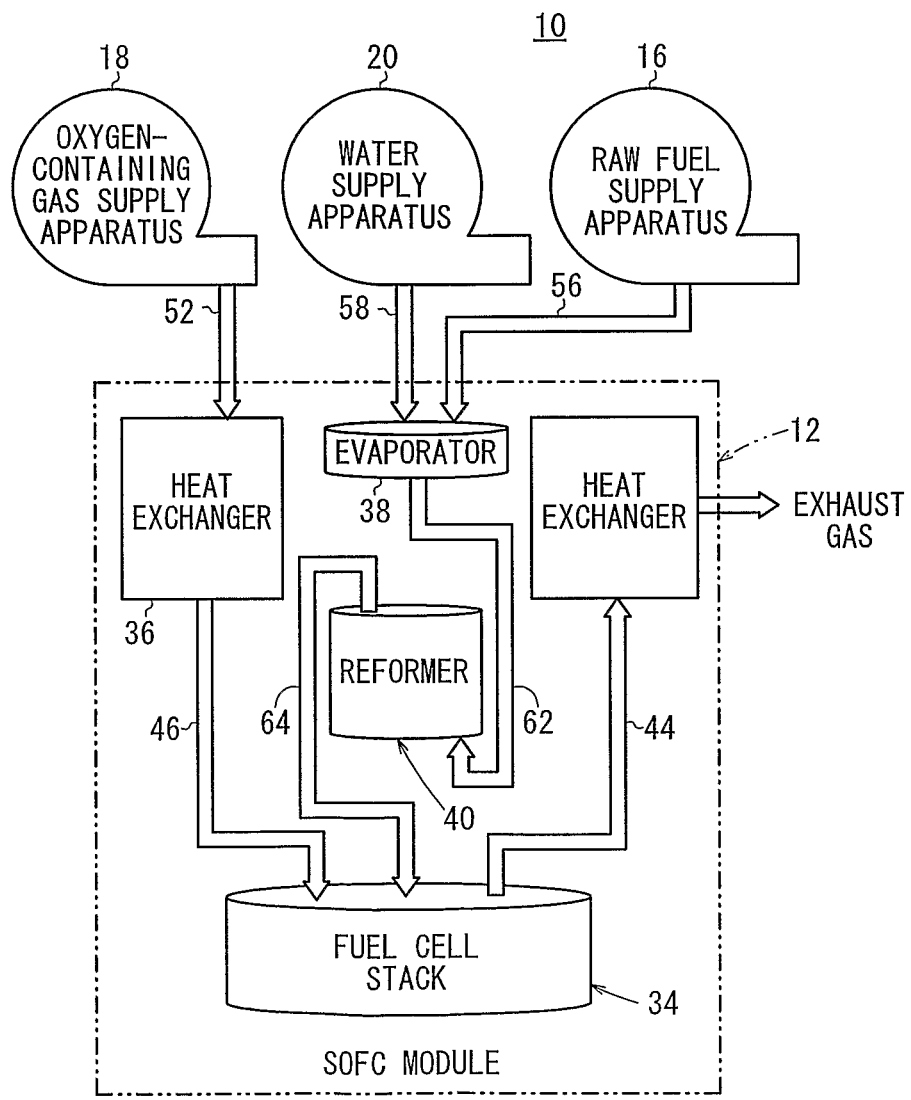
FIG. 1 is a block diagram of a mechanical circuit of a fuel cell system which incorporates a reformer according to a first embodiment of the present invention.

As shown in FIG. 1, a fuel cell system 10 which incorporates a reformer according to a first embodiment of the present invention is used in various applications, e.g., used as a stationary fuel cell system, a vehicle-mounted fuel cell system, or the like.

The fuel cell system 10 comprises a fuel cell module (SOFC module) 12 for generating electrical energy in power generation by electrochemical reactions of a fuel gas (hydrogen gas) and an oxygen-containing gas (air), a raw fuel supply apparatus 16 for supplying a raw fuel, e.g., a city gas, to the fuel cell module 12, an oxygen-containing gas supply apparatus 18 for supplying the oxygen-containing gas to the fuel cell module 12, and a water supply apparatus 20 for supplying water to the fuel cell module 12.

Figure 2:
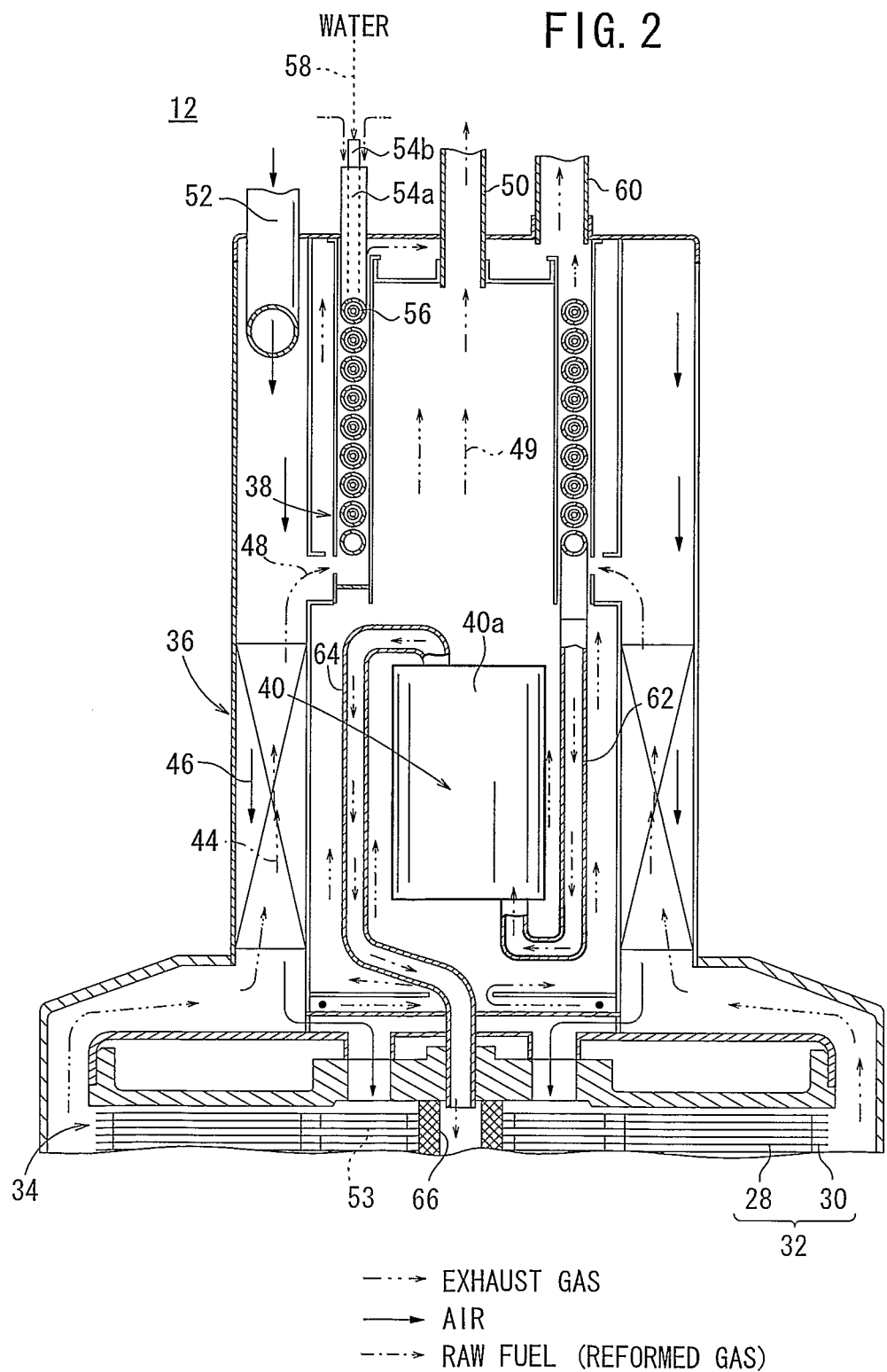
FIG. 2 is a partial cross-sectional view of a fuel cell module of the fuel cell system.

As shown in FIG. 2, the fuel cell module 12 includes a fuel cell stack 34 formed by stacking a plurality of solid oxide fuel cells 32 in a vertical direction. The fuel cells 32 are formed by stacking electrolyte electrode assemblies 28 and separators 30. Though not shown, each of the electrolyte electrode assemblies 28 includes a cathode, an anode, and a solid electrolyte (solid oxide) interposed between the cathode and the anode. For example, the electrolyte is made of ion-conductive solid oxide such as stabilized zirconia.

At an upper end (or a lower end) of the fuel cell stack 34 in the stacking direction, a heat exchanger 36 for heating the oxygen-containing gas before the oxygen-containing gas is supplied to the fuel cell stack 34, an evaporator 38 for evaporating water to produce a mixed fuel of a raw fuel and water vapor, and a reformer 40 according to the first embodiment for reforming the mixed fuel to produce a reformed gas are provided.

The heat exchanger 36 has a first exhaust gas channel 44 serving as a passage of a consumed reactant gas discharged from the fuel cell stack 34 (hereinafter also referred to as the exhaust gas or the combustion exhaust gas) and an air channel 46 serving as a passage of the air for allowing the air serving as a heated fluid and the exhaust gas to flow in a counterflow manner. The first exhaust gas channel 44 is connected to a second exhaust gas channel 48 for supplying the exhaust gas to the evaporator 38 as a heat source for evaporating water. The first exhaust gas channel 44 is connected to an exhaust gas pipe 50 through a heating channel 49 for heating the reformer 40. The upstream side of the air channel 46 is connected to an air supply pipe 52, and the downstream side of the air channel 46 is connected to an oxygen-containing gas supply passage 53 of the fuel cell stack 34.

The evaporator 38 has a dual pipe structure including an outer pipe member 54a and an inner pipe member 54b which are coaxially arranged. The dual pipe is provided in the second exhaust gas channel 48. A raw fuel channel 56 is formed between the outer pipe member 54a and the inner pipe member 54b. Further, a water channel 58 is formed in the inner pipe member 54b. The second exhaust gas channel 48 of the evaporator 38 is connected to a main exhaust pipe 60.

As shown in FIG. 1, the air supply pipe 52 is connected to the oxygen-containing gas supply apparatus 18. The raw fuel channel 56 is connected to the raw fuel supply apparatus 16. The water channel 58 is connected to the water supply apparatus 20.

As shown in FIG. 2, the outer pipe member 54a is connected to a mixed fuel supply pipe 62 which is connected to an inlet of a casing 40a of the reformer 40. One end of a reformed gas supply channel 64 is connected to an outlet of the casing 40a. The other end of the reformed gas supply channel 64 is connected to a fuel gas supply passage 66 defined in the fuel cell stack 34. The evaporator 38 may have a heater and a mixer (e.g., an ejector mixer) instead of the dual pipe structure.

Figure 3:
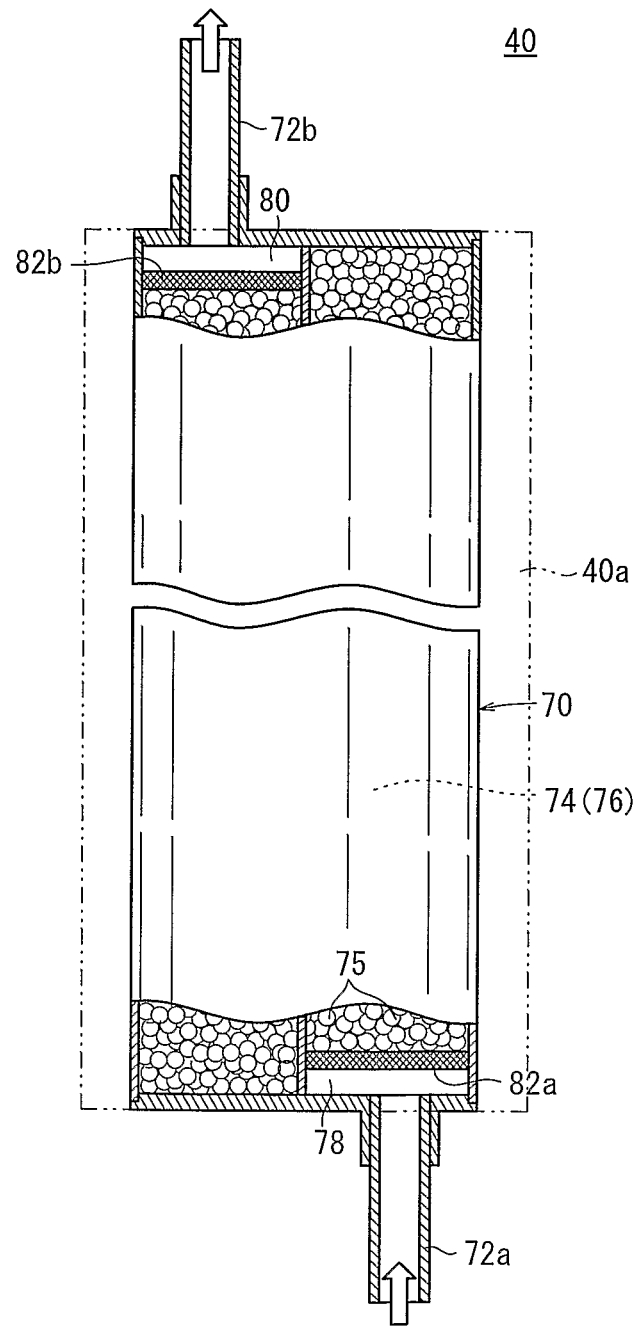
FIG. 3 is a fragmentary front elevational view, partly in cross section, of the reformer according to the first embodiment.
Figure 4:
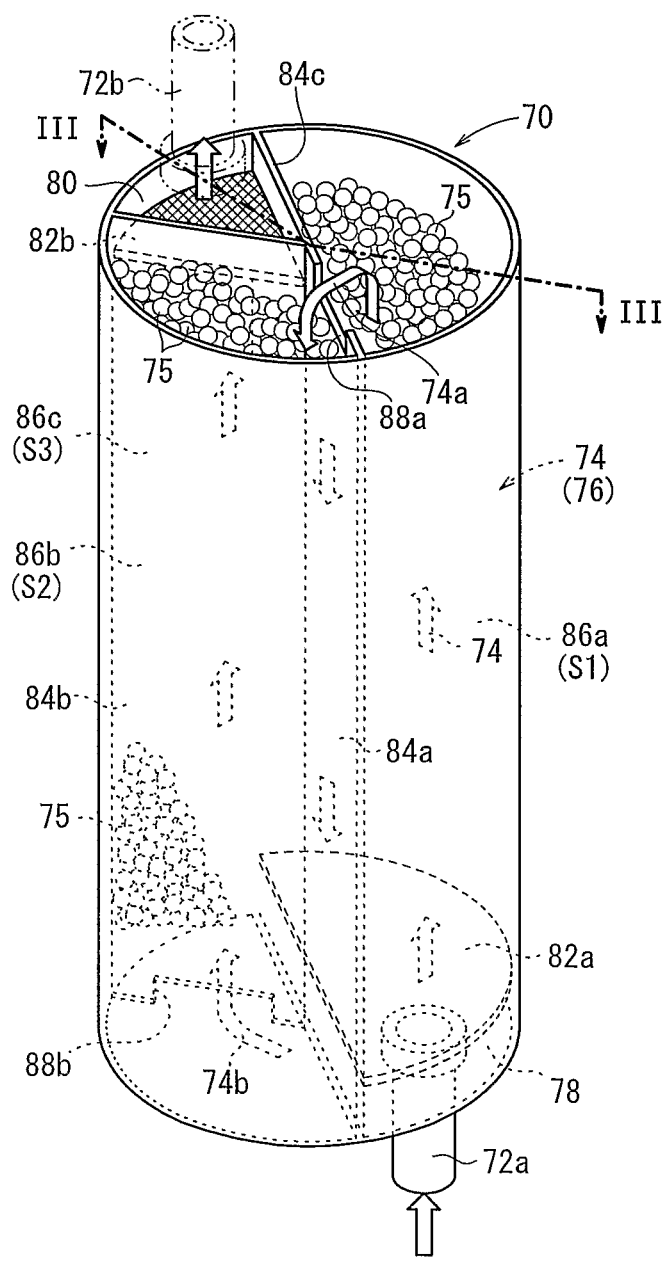
FIG. 4 is a perspective view of the reformer according to the first embodiment.

As shown in FIGS. 3 and 4, the reformer 40 includes a hollow cylindrical tubular body (tubular casing) 70 which extends vertically. The tubular body 70 has a supply port 72a on its lower end for being supplied with a raw fuel (mixed fuel) and a discharge port 72b on its upper end for discharging a reformed gas. The supply port 72a is connected to the outlet side (downstream side) of the evaporator 38, and the discharge port 72b is connected to the inlet side (upstream side) of the fuel cell stack 34 (see FIGS. 1 and 2).

As shown in FIGS. 3 and 4, the tubular body 70 contains therein a reforming chamber 76 having a raw fuel passage 74 for passing the raw fuel therethrough and which is filled with a pelletized reforming catalyst 75 for reforming the raw fuel into a reformed gas, a supply chamber 78 defined between an upstream end of the reforming chamber 76 and the supply port 72a, for uniformly supplying the raw fuel to the reforming chamber 76, and a discharge chamber 80 defined between a downstream end of the reforming chamber 76 and the discharge port 72b, for uniformly discharging the reformed gas from the reforming chamber 76. The raw fuel passage 74 has a first reverser 74a and a second reverser 74b for reversing the direction in which the raw fuel flows, as described in detail later.

The reformer 40 includes a first mesh member 82a which divides the supply chamber 78 and the reforming chamber 76 from each other, and a second mesh member 82b which divides the reforming chamber 76 and the discharge chamber 80 from each other. Though the reformer 40 includes both the first and second mesh members 82a, 82b in FIG. 4, the reformer 40 may have either one of the first and second mesh members 82a, 82b, rather than both.

Figure 5:
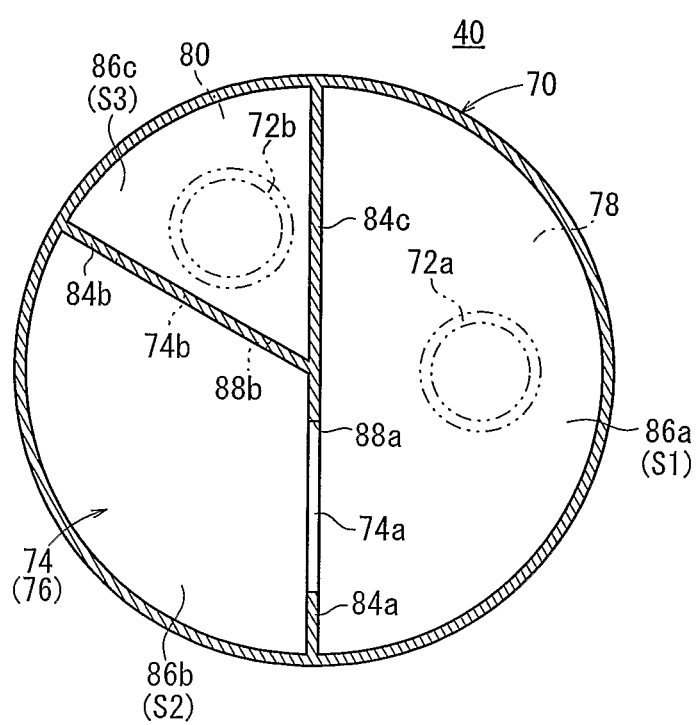
FIG. 5 is a sectional plan view of the reformer according to the first embodiment.

As shown in FIGS. 4 and 5, the tubular body 70 houses therein three partition plates 84a, 84b, 84c extending from the center of the tubular body 70 radially outwardly to the inner circumferential surface of the tubular body 70. These partition plates 84a, 84b, 84c divide the space in the tubular body 70, i.e., the raw fuel passage 74, into a first passage region 86a, a second passage region 86b, and a third passage region 86c.

The first passage region 86a, the second passage region 86b, and the third passage region 86c have respective cross-sectional areas S1, S2, S3 which have the relationship: S1>S2>S3.

The first passage region 86a has a lower end, i.e., an upstream end, held in fluid communication with the supply chamber 78, and an upper end, i.e., a downstream end, held in fluid communication with an upper end, i.e., an upstream end, of the second passage region 86b through a recess 88a which is defined in an upper end portion of the partition plate 84a. The second passage region 86b has a lower end, i.e., a downstream end, held in fluid communication with a lower end, i.e., an upstream end, of the third passage region 86c through a recess 88b which is defined in a lower end portion of the partition plate 84b. The third passage region 86c has an upper end, i.e., a downstream end, held in fluid communication with the discharge chamber 80.

As shown in FIG. 4, the raw fuel passage 74 in the tubular body 70 includes the first passage region 86a that is held in fluid communication with the supply chamber 78, the first reverser 74a that is defined by the recess 88a at the upper end of the first passage region 86a, the second passage region 86b whose cross-sectional area is different from that of the first passage region 86a so that the cross-sectional area of the raw fuel passage 74 changes across the first reverser 74a, the second reverser 74b that is defined by the recess 88b at the lower end of the second passage region 86b, and the third passage region 86c whose cross-sectional area is different from that of the second passage region 86b so that the cross-sectional area of the raw fuel passage 74 changes across the second reverser 74b. The first reverser 74a and the second reverser 74b are arrayed on a circle that is concentric with the center of the tubular body 70 (see FIG. 5).

The raw fuel passage 74 is designed such that the velocity at which the raw fuel flows through the first passage region 86a having the maximum cross-sectional area at a maximum flow rate (i.e., in a rated operation mode) is the same as the velocity at which the raw fuel flows through the third passage region 86c having the minimum cross-sectional area at a minimum flow rate (i.e., in a partial load operation mode).

The reformer 40 is a preliminary reformer for reforming higher hydrocarbons ($C_{2+}$) such as ethane ($C_2H_6$), propane ($C_3H_8$), and butane ($C_4H_{10}$) contained in a city gas (raw fuel) into a fuel gas which primarily contains methane ($CH_4$), hydrogen, and CO, according to a steam reforming process. The reformer 40 is kept at a temperature of several hundreds ° C. while in operation. The raw fuel is not limited to a city gas, but may be LNG, LPG, ethanol, methanol, gasoline, kerosene, biofuel, or the like.

The fuel cells 32 are kept at a high temperature of several hundreds ° C. while in operation. The electrolyte electrode assemblies 28 reform the methane in the fuel gas to produce hydrogen and CO, which are supplied to the anodes.

The reformer 40 may have a function to reform methane in the fuel gas to produce hydrogen and CO, in addition to the function as the preliminary reformer.

Operation of the fuel cell system 10, in relation to the reformer 40 according to the first embodiment, will be described below.

As shown in FIG. 1, when the raw fuel supply apparatus 16 is operated, it supplies a raw fuel, e.g., a city gas (containing $CH_4$, $C_2H_6$, $C_3H_8$, and $C_4H_{10}$) or the like to the raw fuel channel 56. When the water supply apparatus 20 is operated, it supplies water to the water channel 58. When the oxygen-containing gas supply apparatus 18 is operated, it supplies an oxygen-containing gas, e.g., air, to the air supply pipe 52.

As shown in FIG. 2, the evaporator 38 mixes the raw fuel flowing through the raw fuel channel 56 with water vapor to produce a mixed fuel, i.e., a raw fuel. The raw fuel flows through the mixed fuel supply pipe 62, and, as shown in FIGS. 3 and 4, is introduced into the supply chamber 78 of the reformer 40 through the supply port 72a on the lower end thereof.

The raw fuel is first supplied uniformly into the first passage region 86a having the maximum cross-sectional area. The raw fuel flows vertically upwardly through the first passage region 86a while being reformed by the reforming catalyst 75.

When the raw fuel reaches the upper end of the first passage region 86a, the raw fuel is reversed in direction by the first reverser 74a, and introduced into the second passage region 86b having the medium cross-sectional area. The raw fuel flows vertically downwardly through the second passage region 86b while being reformed by the reforming catalyst 75. Then, when the raw fuel reaches the lower end of the second passage region 86b, the raw fuel is reversed in direction by the second reverser 74b, and introduced into the third passage region 86c having the minimum cross-sectional area. The raw fuel flows vertically upwardly through the third passage region 86c while being reformed by the reforming catalyst 75. Thereafter, the raw fuel is discharged uniformly into the discharge chamber 80 which is held in fluid communication with the third passage region 86c.

The discharge port 72b discharges a steam-reformed gas, which is devoid of hydrocarbons $C_{2+}$ and primarily contains methane, into the reformed gas supply channel 64. Thus, the methane in the reformed gas is reformed, and hydrogen gas and CO are then obtained. The fuel gas which primarily contains the hydrogen gas and the CO is supplied to the anodes, not shown, of the fuel cells 32.

As shown in FIG. 2, the air supplied from the air supply pipe 52 to the heat exchanger 36 moves along the air channel 46 in the heat exchanger 36, and is heated to a predetermined temperature by heat exchange with the exhaust gas (to be described later) moving along the first exhaust gas channel 44. The air heated by the heat exchanger 36 is supplied to the oxygen-containing gas supply passage 53 of the fuel cell stack 34, and the air is supplied to the cathodes (not shown).

Thus, in each of the electrolyte electrode assemblies 28, by electrochemical reactions of the fuel gas and the air, power generation is performed. The hot exhaust gas (several hundred ° C.) discharged to the outer circumferential region of each of the electrolyte electrode assemblies 28 flows through the first exhaust gas channel 44 of the heat exchanger 36, and heat exchange with the air is carried out. The air is heated to a predetermined temperature, and the temperature of the exhaust gas is decreased.

When the exhaust gas moves along the second exhaust gas channel 48, the water passing through the water channel 58 is evaporated. After the exhaust gas passes through the evaporator 38, the exhaust gas is discharged to the outside through the main exhaust pipe 60. Part of the exhaust gas passes through the heating channel 49 to heat the reformer 40, and thereafter, is discharged to the outside through the exhaust gas pipe 50.

According to the first embodiment, since the raw fuel that is supplied to the reformer 40 is temporarily stored in the supply chamber 78, the raw fuel is supplied uniformly to the entire area of the first passage region 86a. The reformed raw fuel (i.e., reformed gas) flows from the reforming chamber 76 and is temporarily stored in the discharge chamber 80. Therefore, the reformed gas is discharged uniformly from the entire area of the third passage region 86c. Consequently, the entire area of the reforming catalyst 75 can effectively be utilized, whereby reforming efficiency is easily improved.

Further, the raw fuel passage 74 has the first reverser 74a and the second reverser 74b for reversing the direction in which the raw fuel flows. Therefore, the overall length of the reformer 40 is reduced, whereas the raw fuel passage 74 is effectively elongated. Since the raw fuel and the reforming catalyst 75 are held in contact with each other over a long period of time, the reformer 40 has a high reforming capability.

Furthermore, the cross-sectional area of the raw fuel passage 74 is smaller in its downstream portion than in its upstream portion. Specifically, the raw fuel passage 74 includes the first passage region 86a having the maximum cross-sectional area S1, the second passage region 86b having the medium cross-sectional area S2, and the third passage region 86c having the minimum cross-sectional area S3, the first through third passage regions 86a, 86b, 86c being successively arranged in the order named from upstream toward downstream with respect to the direction in which the raw fuel flows.

In a partial load operation mode, the raw fuel flows through the third passage region 86c having the minimum cross-sectional area (if necessary, also through the second passage region 86b) at a minimum flow velocity. In a rated operation mode, the raw fuel flows through the entire raw fuel passage 74 (including the first through third passage regions 86a, 86b, 86c) at a minimum flow velocity.

If the flow velocity of the raw fuel becomes lower than the minimum flow velocity in the reformer 40, then the raw fuel tends to flow unevenly, causing a certain region of the reforming catalyst 75 to be deteriorated rapidly, and hence making it less durable. If the raw fuel passage 74 comprises only passage regions having a small cross-sectional area in order to prevent the raw fuel from flowing unevenly, then the raw fuel passage 74 needs to be elongated in order to achieve a desired reforming capability, and hence is liable to cause a high pressure loss in the rated operation mode.

According to the first embodiment, the raw fuel passage 74 includes the first passage region 86a, the second passage region 86b, and the third passage region 86c which have different cross-sectional areas. In a wide operating range, the raw fuel passage 74 thus constructed is effective to prevent uneven flow distribution of the raw fuel and to prevent a pressure loss from occurring, and is also effective to utilize the reforming catalyst 75 in its entirety over a long period of time. The reformer 40 is therefore highly durable and can be serviced for maintenance at increased time intervals.

The first passage region 86a, the second passage region 86b, and the third passage region 86c are arranged such that their cross-sectional areas are successively smaller from upstream toward downstream in the order named with respect to the direction in which the raw fuel flows. Accordingly, the raw fuel passage 74 has a function as a pressure regulation chamber (buffer tank). Even if the raw fuel supply apparatus 16 causes raw fuel pulsation flows, the raw fuel passage 74, i.e., the reformer 40, absorbs such raw fuel pulsation flows. The fuel cell module 12 is thus prevented from producing unstable electric output levels.

In the reformer 40, the cross-sectional area of the first passage region 86a is reduced to the cross-sectional area of the second passage region 86b by passing through the first reverser 74a, and the cross-sectional area of the second passage region 86b is reduced to the cross-sectional area of the third passage region 86c by passing through the second reverser 74b. The reformer 40 has the hollow cylindrical tubular body 70, and the first reverser 74a and the second reverser 74b are arrayed on a circle that is concentric with the center of the tubular body 70.

Therefore, the raw fuel passage 74 is effectively elongated while the overall length of the reformer 40 is reduced. As the raw fuel and the reforming catalyst 75 are held in contact with each other over a long period of time, the reformer 40 has a high reforming capability. Moreover, the reformer 40 is simplified in structure and reduced in size.

The reformer 40 has the discharge port 72b held in fluid communication with the discharge chamber 80, and the downstream second reverser 74b is positioned below the discharge port 72b. Accordingly, the raw fuel flows through the raw fuel passage 74 upwardly toward the discharge port 72b, and hence is kept in contact with the reforming catalyst 75 over a long period of time. The reformer 40 has a high reforming capability and is reduced in size.

When the reforming catalyst 75 is deteriorated and fragmented into small pieces after it has been used over a long period of time, since the raw fuel flows upwardly as an upward flow, the fragmented pieces of the reforming catalyst 75 are prevented from accumulating in a lower portion of the reformer 40. Accordingly, the raw fuel is enabled to effectively flow through the reforming catalyst 75, so that the overall area of the reforming catalyst 75 can effectively be utilized and the reforming catalyst 75 can be used over a long period of time. In addition, the fragmented pieces of the reforming catalyst 75 are prevented from flowing downstream of the reformer 40. Consequently, any pressure losses and auxiliary losses caused by devices connected downstream of the reformer 40, e.g., the fuel cell stack 34, pipes, etc., are reduced, and those devices are increased in efficiency and service life.

According to the first embodiment, the raw fuel passage 74 has an even number of (two) reversers, i.e., the first reverser 74a and the second reverser 74b. Therefore, the supply chamber 78 and the discharge chamber 80 are allowed to be positioned on the respective opposite ends of the reformer 40. Therefore, the pipe for supplying the raw fuel and the pipe for discharging the reformed gas are not placed closely together, but are easily positioned and connected to the reformer 40.

Further, the supply port 72a which is held in fluid communication with the supply chamber 78 is positioned below the discharge port 72b which is held in fluid communication with the discharge chamber 80. Since the raw fuel flows through the raw fuel passage 74 from the lower supply port 72a to the upper discharge port 72b, the raw fuel and the reforming catalyst 75 are kept in contact with each other over a long period of time. Therefore, the reformer 40 has a high reforming capability and is reduced in size.

When the reforming catalyst 75 is deteriorated and fragmented into small pieces after it has been used over a long period of time, since the raw fuel flows upwardly as an upward flow, the fragmented pieces of the reforming catalyst 75 are prevented from accumulating in a lower portion of the reformer 40. Accordingly, the raw fuel is enabled to effectively flow through the reforming catalyst 75, so that the overall area of the reforming catalyst 75 can effectively be utilized and the reforming catalyst 75 can be used over a long period of time. In addition, the fragmented pieces of the reforming catalyst 75 are prevented from flowing downstream of the reformer 40. Consequently, any pressure losses and auxiliary losses caused by devices connected downstream of the reformer 40, e.g., the fuel cell stack 34, pipes, etc., are reduced, and those devices are increased in efficiency and service life.

The raw fuel passage 74 includes the first passage region 86a, the second passage region 86b, and the third passage region 86c, such that the cross-sectional area of the raw fuel passage 74 is reduced stepwise from upstream toward downstream across the first reverser 74a and the second reverser 74b. Though the present invention is simple in structure, the following is achieved. That is, in a partial load operation mode, the raw fuel flows through the third passage region 86c having the minimum cross-sectional area (if necessary, also through the second passage region 86b) at a minimum flow velocity, and in a rated operation mode, the raw fuel flows through the entire raw fuel passage 74 (including the first through third passage regions 86a, 86b, 86c) at a minimum flow velocity.

Accordingly, in a wide operating range, the raw fuel passage 74 thus constructed is effective to prevent uneven flow distribution of the raw fuel, and to utilize the reforming catalyst 75 in its entirety over a long period of time. The reformer 40 is therefore highly durable and can be serviced for maintenance at increased time intervals.

In addition, the reformer 40 has a function as a pressure regulation chamber. Therefore, the reformer 40 can stably supply the reformed gas, thus enabling the fuel cells 32 to operate stably.

Furthermore, the raw fuel passage 74 is designed such that the velocity at which the raw fuel flows through the first passage region 86a at a maximum flow rate is the same as the velocity at which the raw fuel flows through the third passage region 86c at a minimum flow rate. Therefore, in a partial load operation mode, the raw fuel flows through the third passage region 86c at a minimum flow velocity, and in a rated operation mode, the raw fuel flows through the entire raw fuel passage 74 at a minimum flow velocity.

Accordingly, in a wide operating range, the raw fuel passage 74 is effective to prevent uneven flow distribution of the raw fuel, and to utilize the reforming catalyst 75 in its entirety over a long period of time. The reformer 40 is therefore highly durable and can be serviced for maintenance at increased time intervals.

The reformer 40 includes the first mesh member 82a which divides the supply chamber 78 and the reforming chamber 76 from each other, and the second mesh member 82b which divides the reforming chamber 76 and the discharge chamber 80 from each other. The first mesh member 82a is capable of removing dust particles and foreign matter from the raw fuel and also of preventing the fragmented reforming catalyst 75 from flowing upstream toward the supply port 72a. The second mesh member 82b is capable of preventing the fragmented reforming catalyst 75 from flowing downstream toward the discharge port 72b.

Further, the fuel cell module 12 comprises a solid oxide fuel cell (SOFC) module used for a high-temperature fuel cell system. Thus, the fuel cell system 10 which incorporates the fuel cells 32 having a wide operating range is capable of suitably preventing uneven flow distribution and pulsation flows of the raw fuel, and can be reduced in size. In addition, temperature changes are suppressed, and hence, such a fuel cell system is optimum for use as a high-temperature fuel cell system.

Incidentally, instead of the solid oxide fuel cell module, the present invention is also suitably applicable to other types of fuel cell modules. For example, molten carbonate fuel cells (MCFC), phosphoric acid fuel cells (PAFC), hydrogen membrane fuel cells (HMFC), solid polymer electrolyte fuel cells (PEFC), etc can be adopted suitably.

In the first embodiment, the reformer 40 includes the pelletized reforming catalyst 75. However, the present invention is not limited thereto, and the reformer 40 may incorporate a catalyst section comprising a honeycomb structure which carries a reforming catalyst. Such a modification is also applicable to other embodiments to be described below.

Figure 6:
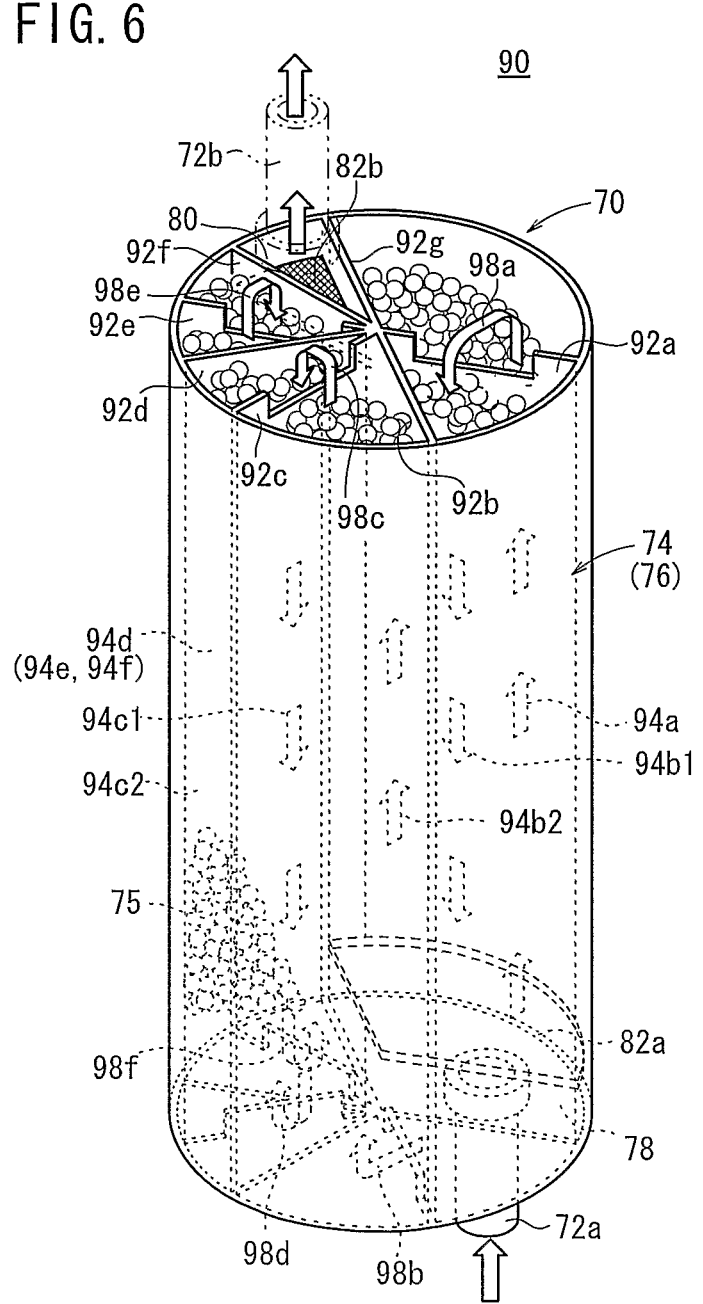
FIG. 6 is a perspective view of a reformer according to a second embodiment of the present invention.
Figure 7:
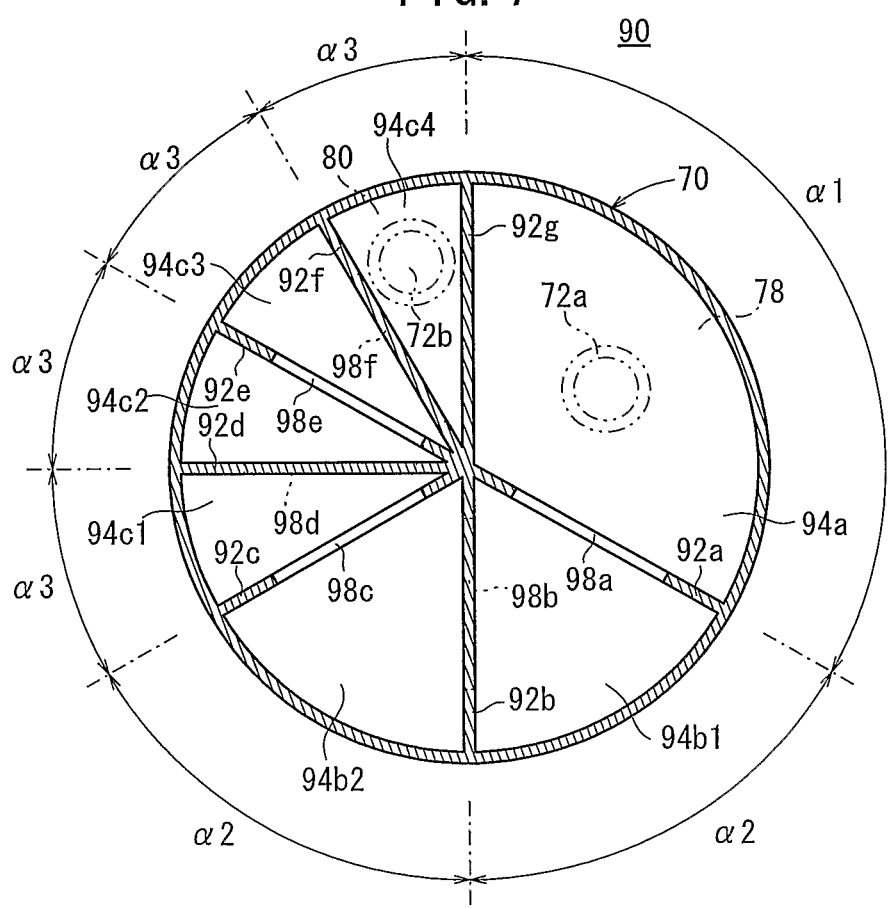
FIG. 7 is a sectional plan view of the reformer according to the second embodiment.
Figure 8:
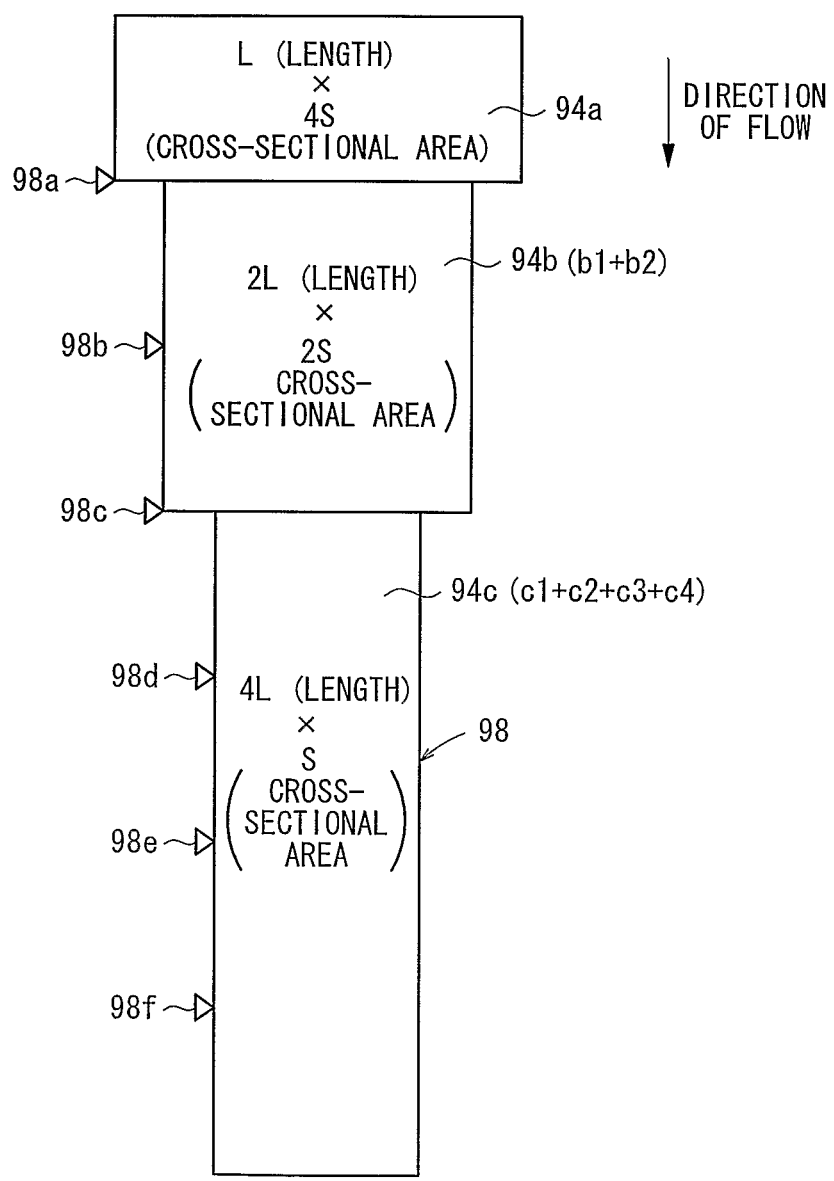
FIG. 8 is a schematic diagram showing an expanded representation of a raw fuel passage in the reformer according to the second embodiment.

FIG. 6 is a perspective view of a reformer 90 according to a second embodiment of the present invention. FIG. 7 is a sectional plan view of the reformer 90. FIG. 8 is a schematic diagram showing an expanded representation of a raw fuel passage in the reformer 90.

Those parts of the reformer 90 which are identical to those of the reformer 40 according to the first embodiment are denoted by identical reference characters, and will not be described in detail below. Similarly, those parts of reformers according to third through seventh embodiments to be described below which are identical to those of the reformer 40 according to the first embodiment are denoted by identical reference characters, and will not be described in detail below.

As shown in FIG. 7, the reformer 90 comprises a hollow cylindrical tubular body 70 which houses therein a plurality of partition plates 92a through 92g extending from the center of the tubular body 70 radially outwardly to the inner circumferential surface of the tubular body 70. These partition plates 92a through 92g divide the space in the tubular body 70 into a first passage region 94a, two second passage regions 94b1, 94b2, and four third passage regions 94c1, 94c2, 94c3, 94c4.

The partition plates 92a, 92g are angularly spaced from each other by an angle α1 of 120°. The partition plates 92a, 92b are angularly spaced from each other by an angle α2 of 60°. The partition plates 92b, 92c are angularly spaced from each other by an angle α2 of 60°. The partition plates 92c, 92d are angularly spaced from each other by an angle α3 of 30°. The partition plates 92d, 92e are angularly spaced from each other by an angle α3 of 30°. The partition plates 92e, 92f are angularly spaced from each other by an angle α3 of 30°. The partition plates 92f, 92g are angularly spaced from each other by an angle α3 of 30°.

The partition plates 92a, 92g jointly define therebetween a first passage region 94a having a maximum cross-sectional area. The partition plates 92a, 92b and the partition plates 92b, 92c jointly define therebetween respective second passage regions 94b1, 94b2 each having a medium cross-sectional area. The partition plates 92c, 92d, the partition plates 92d, 92e, the partition plates 92e, 92f, and the partition plates 92f, 92g jointly define therebetween respective third passage regions 94c1, 94c2, 94c3, 94c4 each having a minimum cross-sectional area.

The partition plate 92a has a first reverser 98a defined in an upper end portion thereof by a recess. The partition plate 92b has a second reverser 98b defined in a lower end portion thereof by a recess. The partition plate 92c has a third reverser 98c defined in an upper end portion thereof by a recess. The partition plate 92d has a fourth reverser 98d defined in a lower end portion thereof by a recess. The partition plate 92e has a fifth reverser 98e defined in an upper end portion thereof by a recess. The partition plate 92f has a sixth reverser 98f defined in a lower end portion thereof by a recess.

As schematically shown in FIG. 8, the reformer 90 has a raw fuel passage 98 defined in the hollow cylindrical tubular body 70. The raw fuel passage 98 includes the first passage region 94a, a second passage region 94b which refers to a combination of the second passage regions 94b1, 94b2, and a third passage region 94c which refers to a combination of the third passage regions 94c1, 94c2, 94c3, 94c4. The first passage region 94a, the second passage region 94b, and the third passage region 94c have the same volume as each other.

According to the second embodiment, firstly, a raw fuel that is introduced into the supply chamber 78 from the supply port 72a on the lower end of the reformer 90 is supplied to the first passage region 94a having the maximum cross-sectional area, and flows upwardly through the first passage region 94a. Then, the raw fuel is reversed in direction by the first reverser 98a, and introduced into the second passage region 94b1 having the medium cross-sectional area.

The raw fuel flows downwardly through the second passage region 94b1, and then is reversed in direction by the second reverser 98b. Thereafter, the raw fuel is introduced into the second passage region 94b2, and flows upwardly through the second passage region 94b2. The raw fuel which has reached the upper end of the second passage region 94b2 is reversed in direction by the third reverser 98c. Thereafter, the raw fuel is introduced into the third passage region 94c1 having the minimum cross-sectional area, and flows downwardly through the third passage region 94c1.

The raw fuel is reversed in direction by the fourth reverser 98d, and is introduced into the third passage region 94c2 and flows upwardly through the third passage region 94c2.

Thereafter, the raw fuel is reversed in direction by the fifth reverser 98e, and is introduced into the third passage region 94c3 and flows downwardly through the third passage region 94c3. The raw fuel is reversed in direction by the sixth reverser 98f, is introduced into the third passage region 94c4 and flows upwardly through the third passage region 94c4. Thereafter, the raw fuel is discharged from the discharge chamber 80 into the discharge port 72b.

Thus, the reformer 90 according to the second embodiment offers the same advantages as the reformer 40 according to the first embodiment. In addition, the first passage region 94a, the second passage region 94b, and the third passage region 94c have the same volume as each other, while the first passage region 94a, the second passage region 94b, and the third passage region 94c have different cross-sectional areas.

In a partial load operation mode, the raw fuel is reformed mainly in the region of the raw fuel passage 98 that has a smaller cross-sectional area, e.g., in the third passage region 94c. In a rated operation mode, the raw fuel is reformed in the entire regions of the raw fuel passage 98, i.e., the first passage region 94a, the second passage region 94b, and the third passage region 94c. Accordingly, the reformer 90 is capable of stably reforming the raw fuel in a wide operating range, and is highly durable.

Figure 9:
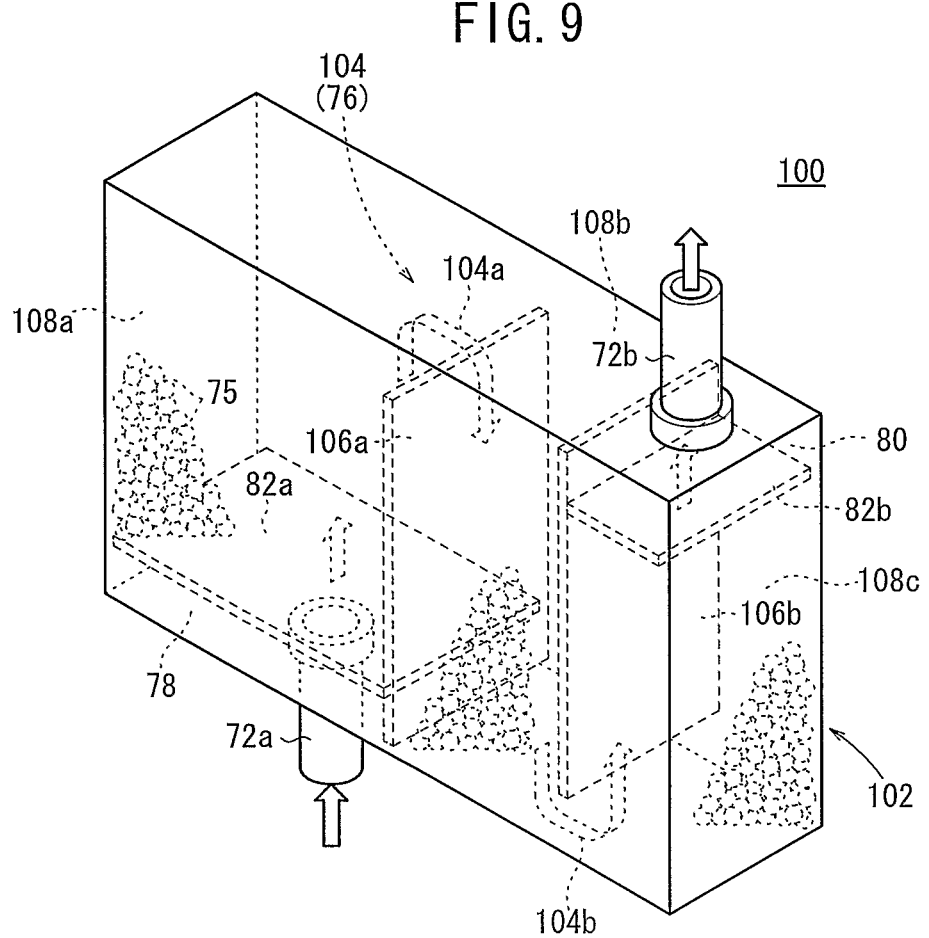
FIG. 9 is a perspective view of a reformer according to a third embodiment of the present invention.
Figure 10:
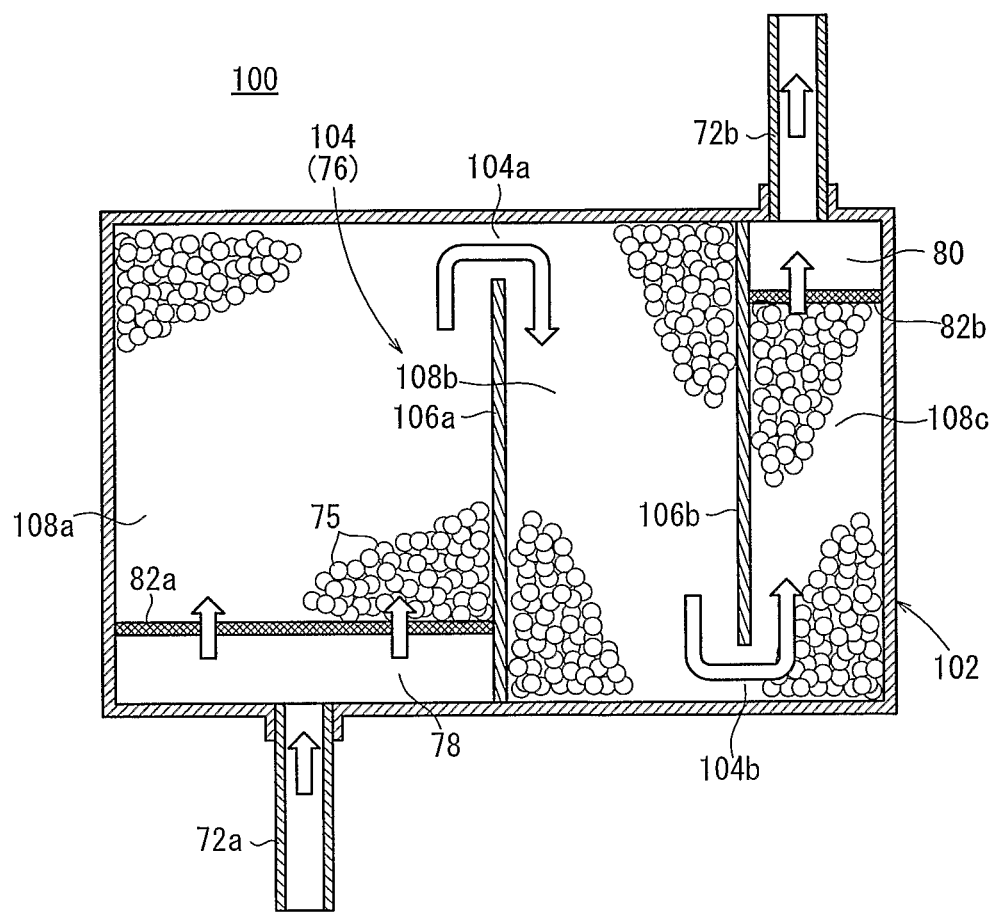
FIG. 10 is a sectional side elevational view of the reformer according to the third embodiment.

FIG. 9 is a perspective view of a reformer 100 according to a third embodiment of the present invention, and FIG. 10 is a sectional side elevational view of the reformer 100.

As shown in FIGS. 9 and 10, the reformer 100 includes a box-shaped casing 102 having a supply chamber 78 defined in a lower portion near one end thereof and held in fluid communication with a supply port 72a on the lower end of the casing 102, and a discharge chamber 80 defined in an upper portion near the other end thereof and held in fluid communication with a discharge port 72b on the upper end of the casing 102. The casing 102 defines therein a reforming chamber 76 including a raw fuel passage 104 which has a first reverser 104a and a second reverser 104b for reversing the direction in which the raw fuel flows.

The casing 102 includes partition plates 106a, 106b disposed therein. The first reverser 104a is formed by cutting off an upper end portion of the partition plate 106a, and the second reverser 104b is formed by cutting off a lower end portion of the partition plate 106b. The raw fuel passage 104 includes a first passage region 108a formed on the upstream side thereof and having a maximum cross-sectional area, a second passage region 108b formed on the downstream side of the first passage region 108a and having a medium cross-sectional area, and a third passage region 108c formed on the downstream side of the second passage region 108b and having a medium cross-sectional area.

The first passage region 108a, the second passage region 108b, and the third passage region 108c have respective cross-sectional areas such that the cross-sectional area of the raw fuel passage 104 is reduced stepwise from upstream toward downstream across the first reverser 104a and the second reverser 104b. The reformer 100 according to the third embodiment offers the same advantages as the reformer 40, 90 according to the first and second embodiments. In addition, the reformer 100 according to the third embodiment is simpler in structure and hence more economical.

Figure 11:
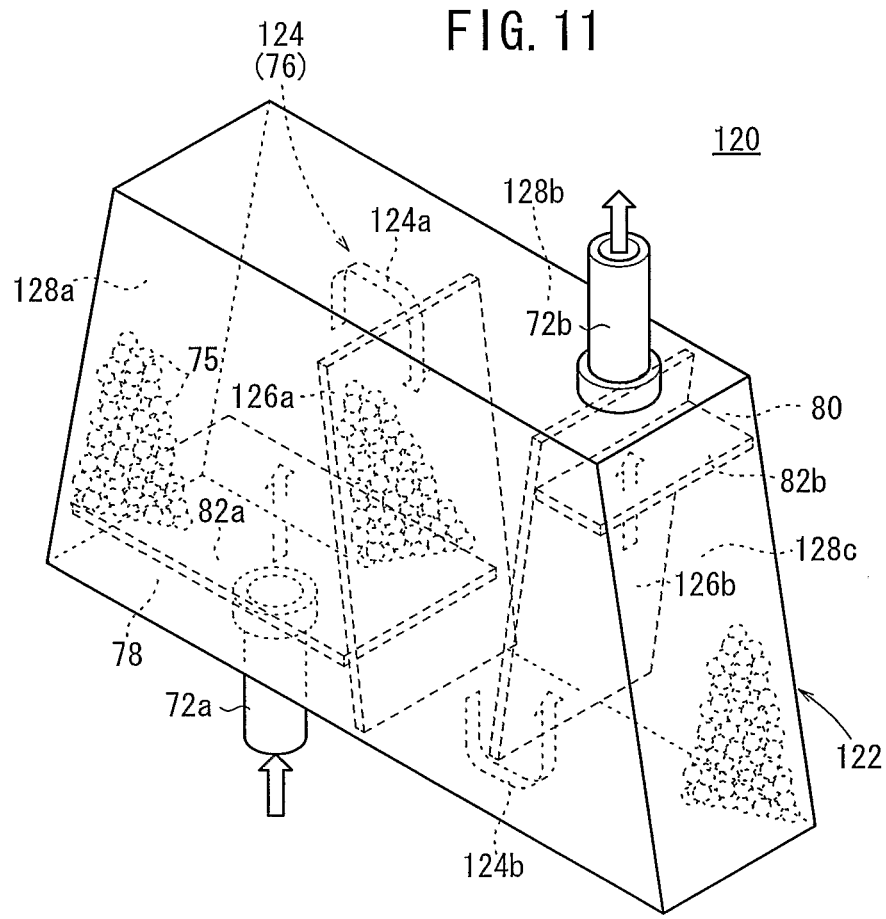
FIG. 11 is a perspective view of a reformer according to a fourth embodiment of the present invention.
Figure 12:
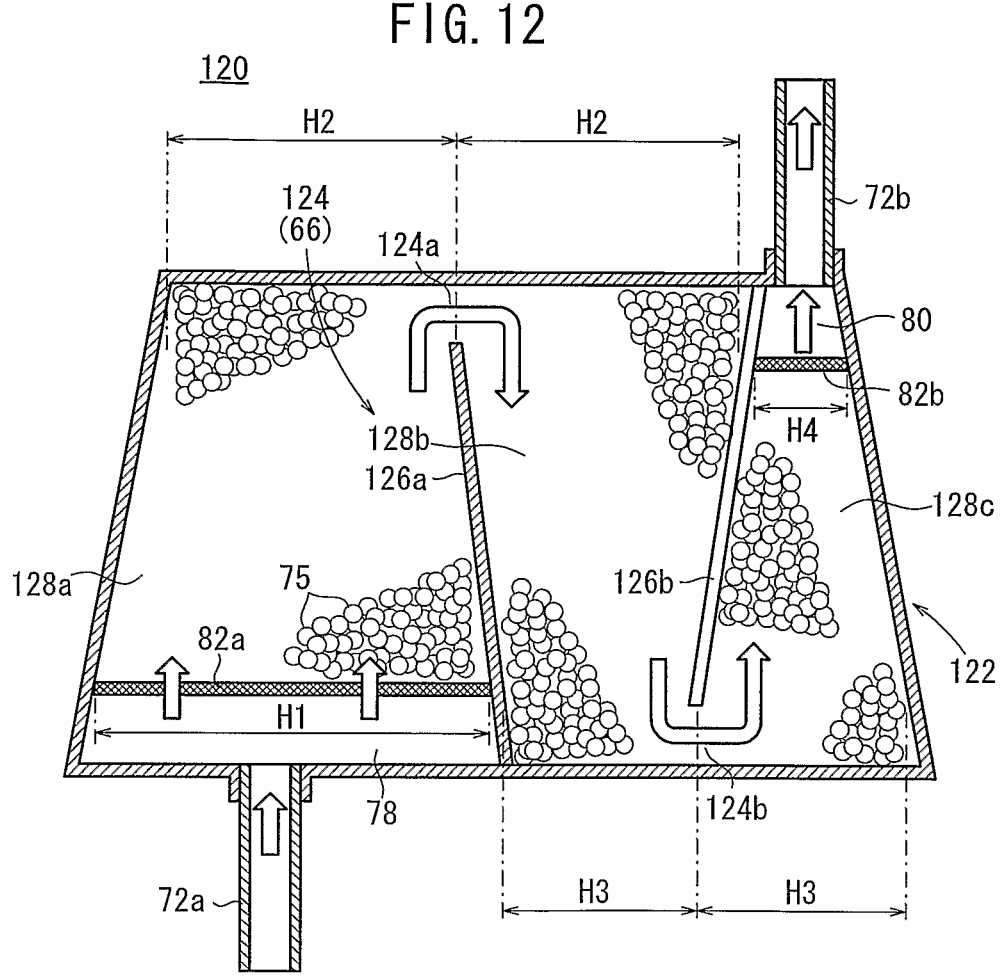
FIG. 12 is a sectional side elevational view of the reformer according to the fourth embodiment.

FIG. 11 is a perspective view of a reformer 120 according to a fourth embodiment of the present invention, and FIG. 12 is a sectional side elevational view of the reformer 120.

As shown in FIGS. 11 and 12, the reformer 120 includes a casing 122, which is essentially trapezoidal as seen from front. The casing 122 has a supply chamber 78 defined in a lower portion near one end thereof and held in fluid communication with a supply port 72a on the lower end of the casing 122, and a discharge chamber 80 defined in an upper portion near the other end thereof and held in fluid communication with a discharge port 72b on the upper end of the casing 122. The casing 122 defines therein a raw fuel passage 124 which has a first reverser 124a and a second reverser 124b for reversing the direction in which the raw fuel flows.

The casing 122 includes two partition plates 126a, 126b disposed therein which are inclined in respective directions. The first reverser 124a is formed by cutting off an upper end portion of the partition plate 126a, and the second reverser 124b is formed by cutting off a lower end portion of the partition plate 126b.

The raw fuel passage 124 includes a first passage region 128a having a maximum cross-sectional area, a second passage region 128b having a medium cross-sectional area, and a third passage region 128c having a minimum cross-sectional area. The first passage region 128a, the second passage region 128b, and the third passage region 128c are defined by the partition plates 126a, 126b.

The first passage region 128a has a maximum width H1 at its upstream inlet end and a minimum width H2 at its downstream outlet end. The second passage region 128b has a maximum width H2 at its upstream inlet end and a minimum width H3 at its downstream outlet end. The third passage region 128c has a maximum width H3 at its upstream inlet end and a minimum width H4 at its downstream outlet end.

Thus, in the raw fuel passage 124, the first passage region 128a, the second passage region 128b, and the third passage region 128c have respective cross-sectional areas progressively continuously reduced from upstream toward downstream. The reformer 120 according to the fourth embodiment offers the same advantages as the reformer according to the first, second, and third embodiments. In addition, since the cross-sectional area of the raw fuel passage 124 is progressively continuously reduced from the supply chamber 78 toward the discharge chamber 80, the reformer 120 according to the fourth embodiment is capable of preventing a pressure loss from increasing as much as possible.

Figure 13:
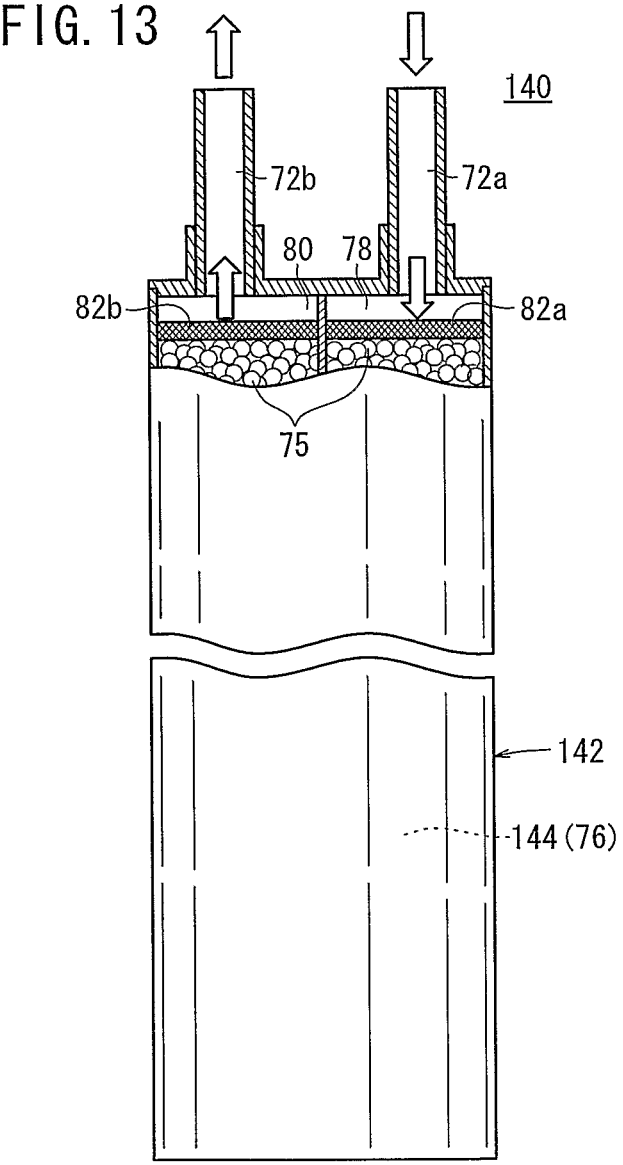
FIG. 13 is a fragmentary front elevational view, partly in cross section, of a reformer according to a fifth embodiment of the present invention.
Figure 14:
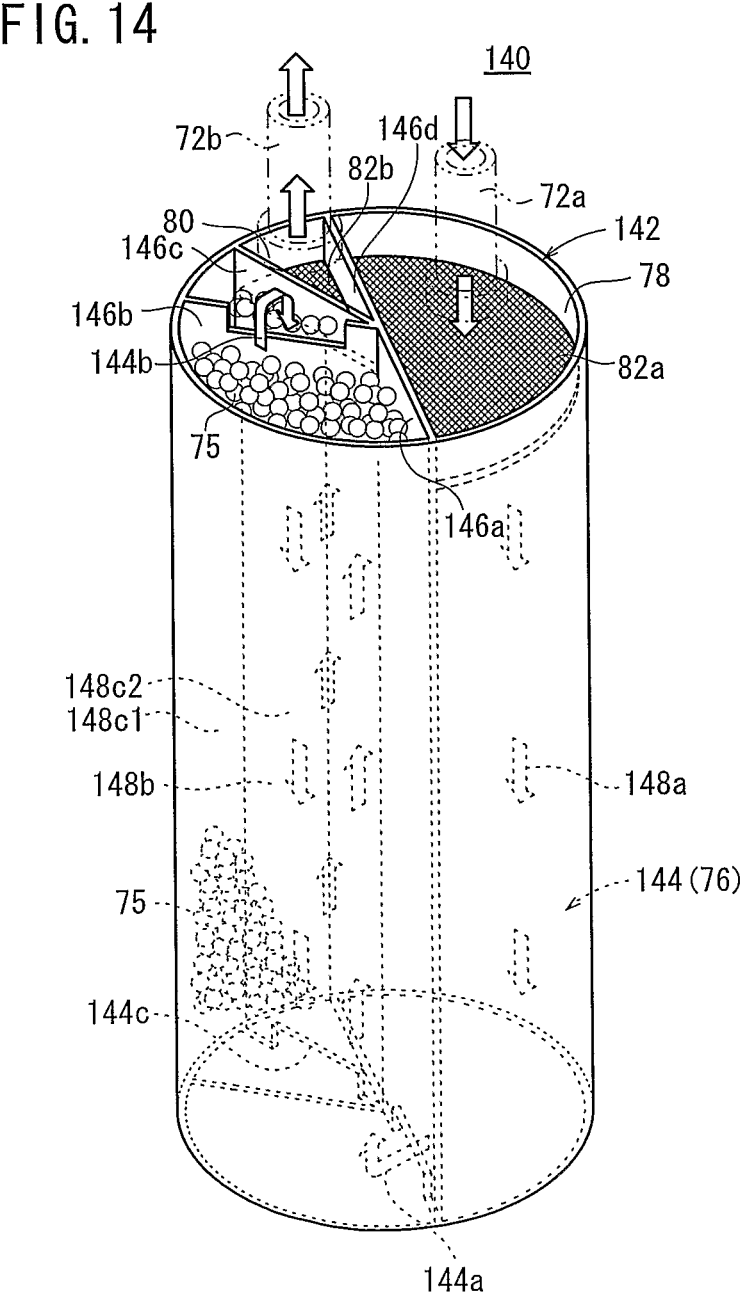
FIG. 14 is a perspective view of the reformer according to the fifth embodiment.

FIG. 13 is a fragmentary front elevational view, partly in cross section, of a reformer 140 according to a fifth embodiment of the present invention. FIG. 14 is a perspective view of the reformer 140, and FIG. 15 is a sectional plan view of the reformer 140.

Figure 15:
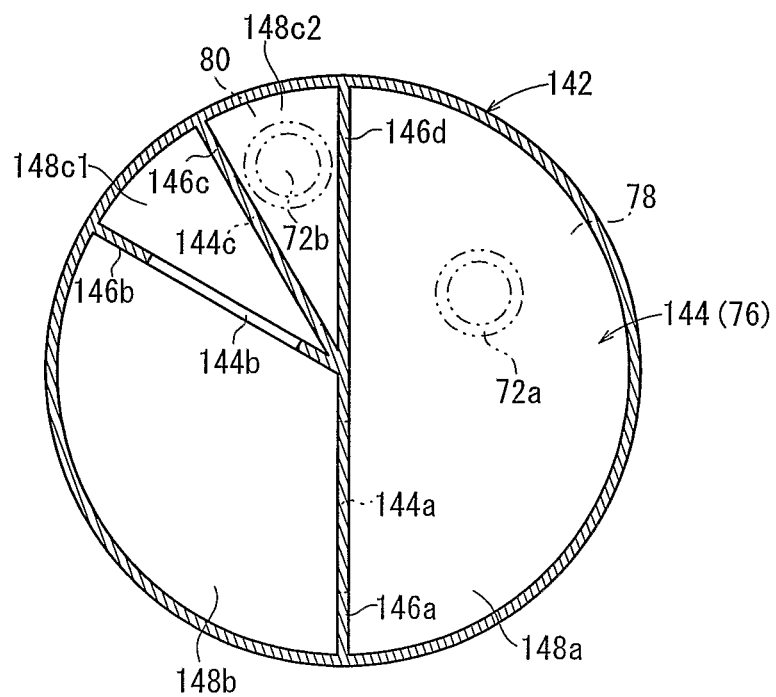
FIG. 15 is a sectional plan view of the reformer according to the fifth embodiment.

As shown in FIGS. 13 through 15, the reformer 140 includes a hollow cylindrical tubular body 142. The tubular body 142 has a supply chamber 78 defined in an upper portion thereof and held in fluid communication with a supply port 72a on the upper end of the tubular body 142, and a discharge chamber 80 defined in an upper portion thereof and held in fluid communication with a discharge port 72b on the upper end of the tubular body 142. The tubular body 142 defines therein a reforming chamber 76 including a raw fuel passage 144 which provides fluid communication between the supply port 72a and the discharge port 72b. The raw fuel passage 144 has a first reverser 144a, a second reverser 144b, and a third reverser 144c for reversing the direction in which the raw fuel flows.

The tubular body 142 houses a plurality of partition plates 146a through 146d extending from the center of the tubular body 142 radially outwardly to the inner circumferential surface of the tubular body 142. The first reverser 144a is formed by cutting off a lower end portion of the partition plate 146a. The second reverser 144b is formed by cutting off an upper end portion of the partition plate 146b. The third reverser 144c is formed by cutting off a lower end portion of the partition plate 146c.

The partition plates 146a, 146d are angularly spaced from each other by a maximum angle, defining therebetween a first passage region 148a having a maximum cross-sectional area. The partition plates 146a, 146b define therebetween a second passage region 148b having a medium cross-sectional area. The partition plates 146b, 146c and the partition plates 146c, 146d define therebetween respective third passage regions 148c1, 148c2 each having a minimum cross-sectional area.

According to the fifth embodiment, the reformer 140 has an odd number of reversers, i.e., the first reverser 144a, the second reverser 144b, and the third reverser 144c. Therefore, the supply chamber 78 and the discharge chamber 80 are disposed in one of the axially opposite ends of the reformer 140, e.g., in the upper end of the tubular body 142. Therefore, the pipe for supplying the raw fuel to the reformer 140 and the pipe for discharging the reformed gas from the reformer 140 are placed closely together, allowing the reformer 140 to be positioned flexibly.

The reformer 140 according to the fifth embodiment is illustrated as having the hollow cylindrical tubular body 142 as with the reformers according to the first and second embodiments. However, the reformer 140 according to the fifth embodiment may have a casing similar in shape to either one of the casings of the reformers according to the third and fourth embodiments.

Figure 16:
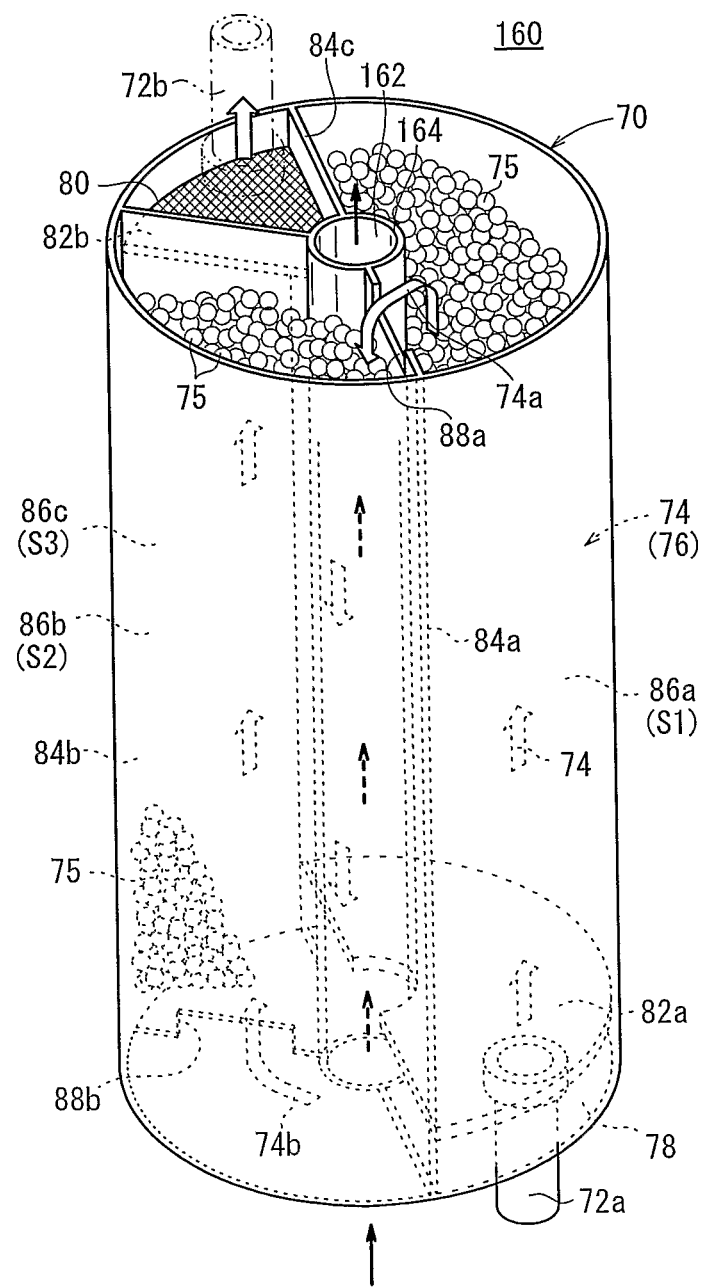
FIG. 16 is a perspective view of a reformer according to a sixth embodiment of the present invention.
Figure 17:
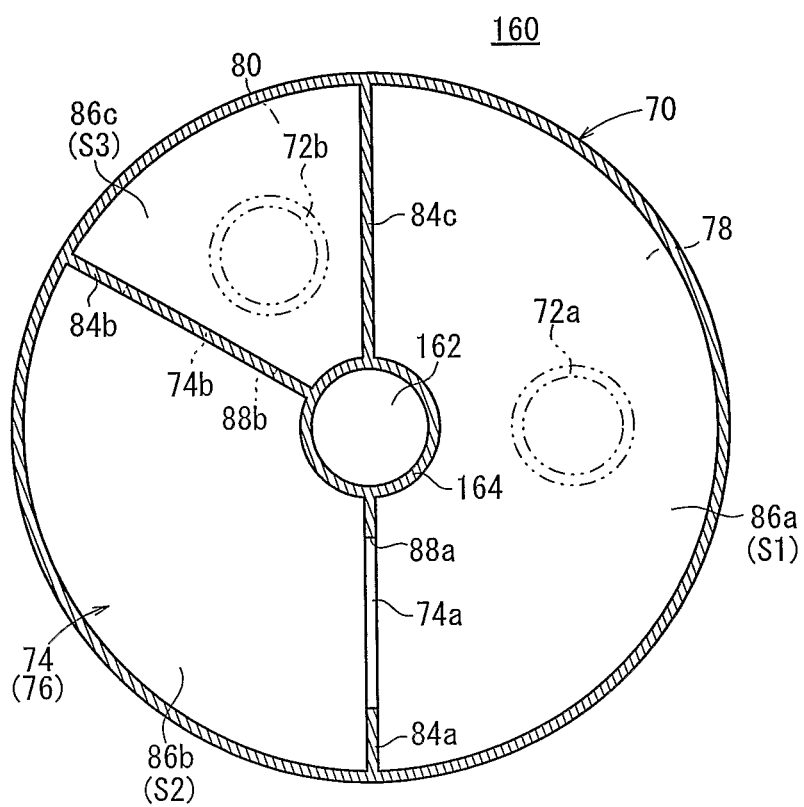
FIG. 17 is a sectional plan view of the reformer according to the sixth embodiment.

FIG. 16 is a perspective view of a reformer 160 according to a sixth embodiment of the present invention, and FIG. 17 is a sectional plan view of the reformer 160.

As shown in FIGS. 16 and 17, the reformer 160 includes a tubular body 70 and a hollow cylindrical member 164 disposed centrally in the tubular body 70 and defining a heating medium passage 162 therein. The tubular body 70 houses therein three partition plates 84a, 84b, 84c extending from the outer circumferential surface of the hollow cylindrical member 164 radially outwardly to the inner circumferential surface of the tubular body 70. The tubular body 70 contains therein a raw fuel passage 74 which includes a first reverser 74a and a second reverser 74b for reversing the direction in which the raw fuel flows. The first reverser 74a and the second reverser 74b are arrayed on a circle that is concentric with the center of the heating medium passage 162.

The heating medium passage 162 extends centrally through the reformer 160 in a direction parallel or opposed to the direction in which the raw fuel flows through the raw fuel passage 74. The heating medium passage 162 has an upstream end portion disposed on the side of the supply chamber 78 in the raw fuel passage 74. The exhaust gas discharged from the fuel cell stack 34 is introduced as a heating medium which flows upwardly through the heating medium passage 162. The exhaust gas discharged from the fuel cell stack 34 is supplied through the heating channel 49 to the heating medium passage 162 (see FIG. 2).

According to the sixth embodiment, the heating medium passage 162 for passing the heating medium for heating the reformer 160 is disposed centrally in the reformer 160, and the first reverser 74a and the second reverser 74b are arrayed on a circle that is concentric with the center of the heating medium passage 162.

Consequently, the heat of the heating medium flowing through the heating medium passage 162 is uniformly transferred to the first reverser 74a (the first passage region 86a and the second passage region 86b) and the second reverser 74b (the second passage region 86b and the third passage region 86c) which are arrayed on the circle that is concentric with the center of the heating medium passage 162, thereby facilitating uniformization of the reforming reaction in the first reverser 74a (the first passage region 86a and the second passage region 86b) and the second reverser 74b (the second passage region 86b and the third passage region 86c). Since the reforming reaction is an endoergic reaction, the uniform transfer of heat to the first reverser 74a (the first passage region 86a and the second passage region 86b) and the second reverser 74b (the second passage region 86b and the third passage region 86c) uniformizes the reforming reaction, thereby making it possible for the reformer 160 to be highly durable and serviced for maintenance at increased time intervals.

Further, as the heating medium passage 162 extends centrally through the reformer 160 in a direction parallel or opposed to the direction in which the raw fuel flows through the raw fuel passage 74, the reforming chamber 76, the reforming catalyst 75, and the raw fuel before reforming can be heated suitably by the heat of the heating medium flowing through the heating medium passage 162. Accordingly, the reformer 160 has an increased reforming efficiency and an increased reforming capability.

Furthermore, the heating medium passage 162 has its upstream end portion disposed on the side of the supply chamber 78 in the raw fuel passage 74. Therefore, much of the heat of the heating medium flowing through the heating medium passage 162 is supplied to the raw fuel passage 74 near the supply chamber 78, and thus, the raw fuel before reforming is suitably heated to promote the reforming reaction.

Figure 18:
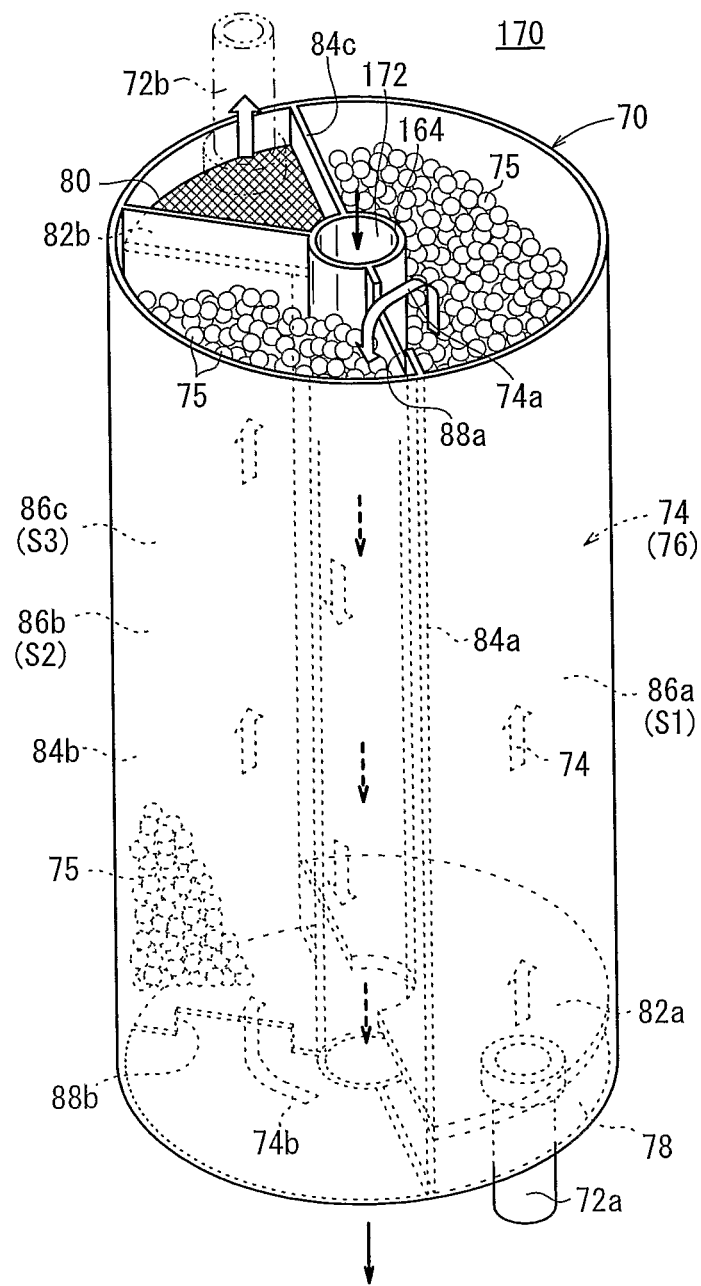
FIG. 18 is a perspective view of a reformer according to a seventh embodiment of the present invention.

FIG. 18 is a perspective view of a reformer 170 according to a seventh embodiment of the present invention.

As shown in FIG. 18, the reformer 170 has a tubular body 70 and a heating medium passage 172 defined centrally in the tubular body 70 thereof. The heating medium passage 172 has an upstream portion disposed on the side of the discharge port 72b in the raw fuel passage 74. A heating medium flows through the heating medium passage 172 in a direction opposite to the direction in which the heating medium flows in the reformer 160 according to the sixth embodiment, i.e., flows downwardly through the heating medium passage 172.

According to the seventh embodiment, the heating medium passage 172 has its upstream end portion disposed on the side of the discharge chamber 80 in the raw fuel passage 74. Therefore, much of the heat of the heating medium flowing through the heating medium passage 172 is supplied to the raw fuel passage 74 near the discharge chamber 80, and thus, the reformed gas is suitably heated to maintain the temperature of the reformed gas to be sent to the downstream side of the reformer 170.

Figure 19:
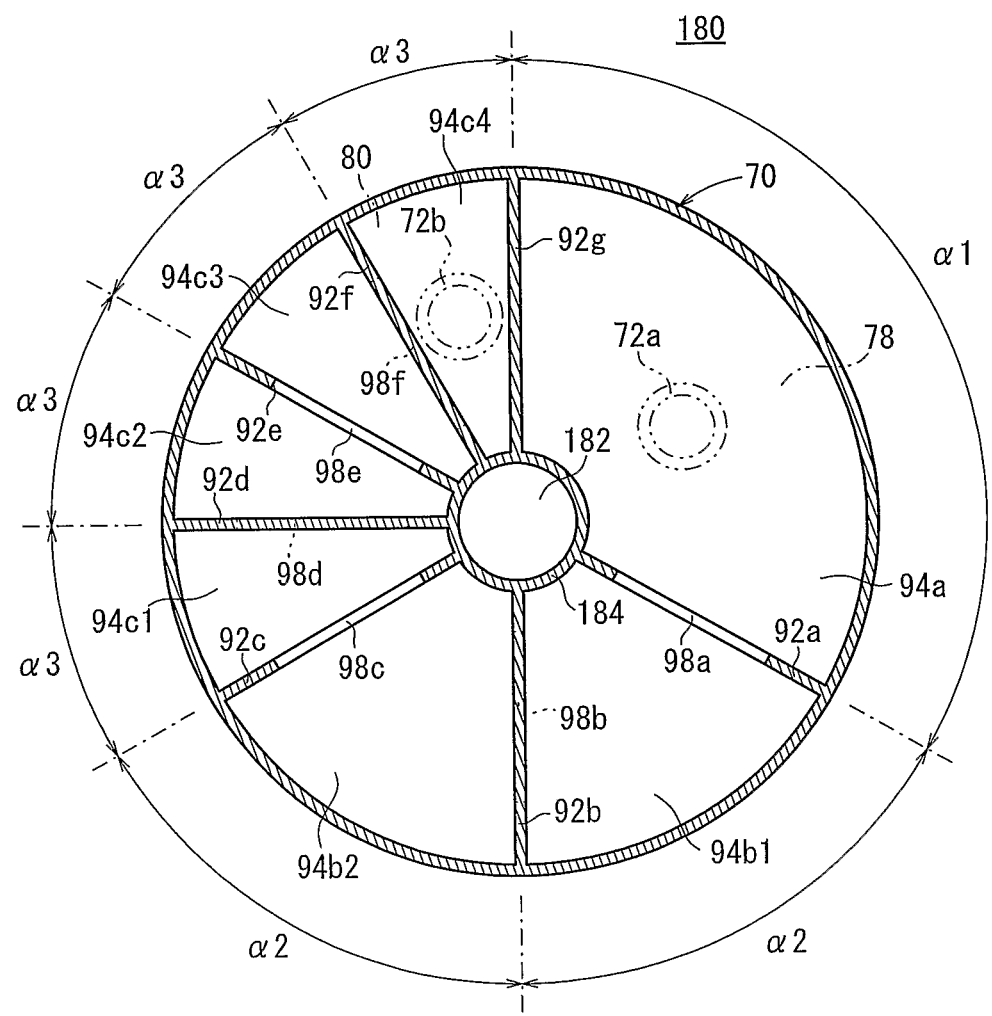
FIG. 19 is a sectional plan view of a reformer according to an eighth embodiment of the present invention.
Figure 20:
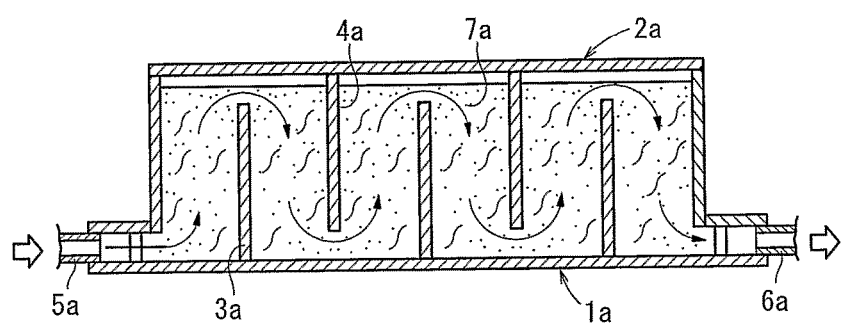
FIG. 20 is a cross-sectional view of a reformer disclosed in Japanese Laid-Open Patent Publication No. 2006-273635.
Figure 21:
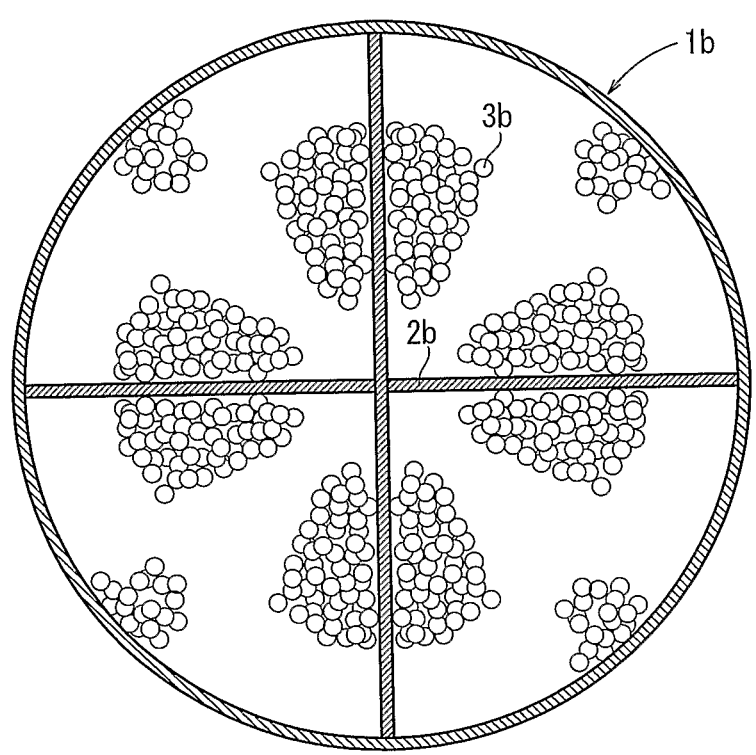
FIG. 21 is a cross-sectional view of a desulfurizer for use with a fuel cell, disclosed in Japanese Laid-Open Patent Publication No. 2008-117652.

FIG. 19 is a sectional plan view of a reformer 180 according to an eighth embodiment of the present invention. The reformer 180 is of a structure similar to the reformer 90 according to the second embodiment. Those parts of the reformer 180 which are identical to those of the reformer 90 are denoted by identical reference characters, and will not be described in detail below.

The reformer 180 includes a tubular body 70 and a hollow cylindrical member 184 disposed centrally in the tubular body 70 and defining a heating medium passage 182 therein.

The tubular body 70 houses therein a plurality of partition plates 92a through 92g extending from the outer circumferential surface of the hollow cylindrical member 184 radially outwardly to the inner circumferential surface of the tubular body 70. The first through sixth reversers 98a through 98f are arrayed on a circle that is concentric with the center of the heating medium passage 182. A heating medium flows either upwardly or downwardly through the heating medium passage 182.

The reformer 180 according to the eighth embodiment offers the same advantages the reformers according to the first through seventh embodiments.

While the invention has been particularly shown and described with reference to preferred embodiments, it will be understood that variations and modifications can be effected thereto by those skilled in the art without departing from the scope of the invention as defined by the appended claims.

The invention claimed is:
1. A reformer for reforming a raw fuel which primarily contains hydrocarbon, comprising:
   a tubular casing including having disposed inside the tubular casing:
      a reforming chamber having a raw fuel passage through which the raw fuel flows;
      a supply chamber disposed upstream of the reforming chamber, for uniformly supplying the raw fuel to the raw fuel passage; and
      a discharge chamber disposed downstream of the reforming chamber, for uniformly discharging the raw fuel from the raw fuel passage,
   wherein
   the raw fuel passage is divided by a plurality of partition plates disposed inside the casing into a first raw fuel passage, a second raw fuel passage, and a third raw fuel passage that are filled with and carrying a reforming catalyst;
   a cross-sectional area of the raw fuel passage is reduced stepwise from an upstream side of the reforming chamber to a downstream side of the reforming chamber and wherein the first raw fuel passage is defined by the tubular casing and at least one of the plurality of partition plates to form a generally semi-circle cross-section, the second raw fuel passage is defined by the tubular casing and multiple ones of the plurality of partition plates to form a first circular sector cross-section, and the third raw fuel passage is defined by the tubular casing and multiple ones of the plurality of partition plates to form a second circular sector cross-section, wherein the cross-sectional area of the second raw fuel passage is smaller than the cross-sectional area of the first raw fuel passage, and the cross-sectional area of the third raw fuel passage is smaller than the cross-sectional area of the second raw fuel passage;
   the first and second raw fuel passages, and the second and third raw fuel passages each have upstream and downstream portions being positioned across reversers;
   the upstream portion is a first flow direction such that the raw fuel flows in one direction;
   the downstream portion is a second flow direction such that the raw fuel flows in a direction opposite to the one direction;
   wherein a second cross-sectional area of the downstream portion which traverses the second flow direction is smaller than a first cross-sectional area of the upstream portion which traverses the first flow direction.

2. A reformer according to claim 1,
wherein the raw fuel passage extends in an axial direction of the tubular casing; and
the reversers are arrayed on a circle that is concentric with the center of the tubular casing.

3. A reformer according to claim 1, further comprising a heating medium passage disposed centrally therein for passage of a heating medium for heating the reformer),
wherein the reversers are arrayed on a circle that is concentric with the center of the heating medium passage.

4. A reformer according to claim 3, wherein the heating medium passage extends centrally through the reformer in a direction parallel or opposed to the direction in which the raw fuel flows.

5. A reformer according to claim 3, wherein the heating medium passage has an upstream portion disposed on the side of the supply chamber in the raw fuel passage.

6. A reformer according to claim 3, wherein the heating medium passage has an upstream portion disposed on the side of the discharge chamber in the raw fuel passage.

7. A reformer according to claim 1, further comprising a discharge port held in fluid communication with the discharge chamber, wherein the most downstream reverser of the reversers is disposed below the discharge port.

8. A reformer according to claim 1, wherein the reversers comprise an even number of reversers.

9. A reformer according to claim 8, further comprising a supply port held in fluid communication with the supply chamber,
wherein the supply port is disposed below the discharge port.

10. A reformer according to claim 1, wherein the reversers comprise an odd number of reversers.

11. A reformer according to claim 1, wherein the cross-sectional area of the raw fuel passage is reduced continuously from upstream toward downstream of the raw fuel passage.

12. A reformer according to claim 1, wherein the raw fuel passage is designed such that the velocity at which the raw fuel flows through a region thereof which has a maximum cross-sectional area at a maximum flow rate is the same as the velocity at which the raw fuel flows through a region thereof which has a minimum cross-sectional area at a minimum flow rate.

13. A reformer according to claim 1, wherein the raw fuel passage has a plurality of passage regions having respective different cross-sectional areas; and the passage regions have the same volume as each other.

14. A reformer according to claim 1, further comprising at least one of a first mesh member which divides the supply chamber and the reforming chamber, and a second mesh member which divides the reforming chamber and the discharge chamber.

15. A reformer according to claim 1, for use with a fuel cell.

16. A reformer according to claim 1, for use with a solid oxide fuel cell.

17. A reformer according to claim 3, wherein the heat medium comprises an exhaust gas discharged from a solid oxide fuel cell.

* * * * *